US012237582B2

United States Patent
(12) United States Patent
Huang et al.

(10) Patent No.: US 12,237,582 B2
(45) Date of Patent: Feb. 25, 2025

(54) ADAPTIVE MMWAVE ANTENNA RADOME

(71) Applicant: Huawei Technologies Co., Ltd., Shenzhen (CN)

(72) Inventors: Wei Huang, San Diego, CA (US); Ping Shi, San Diego, CA (US); Xiaoyin He, San Diego, CA (US)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 197 days.

(21) Appl. No.: 17/905,969

(22) PCT Filed: Mar. 11, 2020

(86) PCT No.: PCT/US2020/021991
§ 371 (c)(1),
(2) Date: Sep. 9, 2022

(87) PCT Pub. No.: WO2020/236245
PCT Pub. Date: Nov. 26, 2020

(65) Prior Publication Data

US 2023/0025983 A1 Jan. 26, 2023

(51) Int. Cl.

| | |
|---|---|
| ***H01Q 15/00*** | (2006.01) |
| ***H01Q 1/24*** | (2006.01) |
| ***H01Q 19/06*** | (2006.01) |
| ***H01Q 21/06*** | (2006.01) |

(52) U.S. Cl.
CPC ........... *H01Q 21/065* (2013.01); *H01Q 1/243* (2013.01); *H01Q 15/006* (2013.01); *H01Q 19/06* (2013.01)

(58) Field of Classification Search
CPC .... H01Q 21/065; H01Q 1/243; H01Q 15/006; H01Q 19/06; H01Q 1/42; H01Q 21/25
See application file for complete search history.

(56) References Cited

U.S. PATENT DOCUMENTS

| | | | | |
|---|---|---|---|---|
| 6,215,455 | B1 * | 4/2001 | Lamata D'Angelo | H01Q 1/2216 343/866 |
| 10,643,961 | B1 * | 5/2020 | Chieh | H01L 24/48 |
| 2006/0267853 | A1 * | 11/2006 | Naito | G06K 19/07749 343/788 |

(Continued)

FOREIGN PATENT DOCUMENTS

| | | | | |
|---|---|---|---|---|
| CN | 109841964 A | | 6/2019 | |
| EP | 2387106 A1 | * | 11/2011 | B29C 45/0046 |

(Continued)

OTHER PUBLICATIONS

Kildal et al. (2009) 'Local metamaterial-based waveguides in gaps between parallel metal plates', IEEE Antennas and Wireless Propagation Letters, 8, pp. 84-87. doi: 10.1109/lawp.2008.2011147 (Year: 2009).*

(Continued)

*Primary Examiner* — Hai V Tran
*Assistant Examiner* — Jordan E. DeWitt
(74) *Attorney, Agent, or Firm* — Slater Matsil, LLP

(57) ABSTRACT

A device includes a device cover and an antenna system underneath the device cover. The device cover is separated from the antenna system. The device cover includes a perfect magnetic conductor (PMC) equivalent material surrounding the antenna system without overlapping the antenna system.

20 Claims, 22 Drawing Sheets

(56) References Cited

U.S. PATENT DOCUMENTS

2007/0120758 A1* 5/2007 Takahashi ................ H01Q 7/08 343/788
2008/0036674 A1* 2/2008 Riedel .................. H01Q 21/062 343/818
2008/0266179 A1* 10/2008 Sotoudeh ........... H01Q 15/0026 343/700 MS
2011/0018775 A1* 1/2011 Brown ..................... H01Q 9/04 343/748
2012/0242556 A1* 9/2012 Ando ....................... H01Q 9/42 343/834
2013/0002504 A1* 1/2013 Lin ........................ H01Q 19/06 343/834
2013/0033405 A1* 2/2013 Stuart ...................... H01Q 9/36 343/787
2013/0044037 A1* 2/2013 Soliman ................... H01Q 1/38 343/848
2013/0207867 A1* 8/2013 Georgescu ........... H01Q 21/065 343/834
2013/0229362 A1* 9/2013 Liu ......................... G06F 3/041 345/173
2014/0028524 A1* 1/2014 Jerauld .................... H01Q 1/52 343/893
2014/0043196 A1* 2/2014 Gouchi .................. H01Q 1/243 343/788
2015/0207913 A1* 7/2015 Nakano ............. H04M 1/72412 455/552.1
2015/0214630 A1* 7/2015 Shimura ................ H01Q 1/243 343/909
2015/0303561 A1* 10/2015 Yang ...................... H01Q 1/526 29/600
2016/0006108 A1* 1/2016 Kato ........................ H01Q 7/08 343/702
2016/0093939 A1* 3/2016 Kim ....................... H01Q 1/243 343/720
2016/0104941 A1* 4/2016 Lee ........................ H01Q 1/523 343/702
2017/0229769 A1* 8/2017 Yokoyama .............. H01L 25/16
2018/0040948 A1* 2/2018 Göttl .................... H01Q 19/108
2018/0294544 A1* 10/2018 Takahashi ................ H01Q 7/00
2018/0294561 A1* 10/2018 Hayes ................ H01Q 15/0066
2019/0109361 A1* 4/2019 Ichinose ................. H01P 3/123
2019/0165473 A1* 5/2019 Yun ...................... H01Q 21/062
2020/0235473 A1* 7/2020 Kaverine ................. H01Q 1/38
2020/0328512 A1* 10/2020 Canete Cabeza ...... H01Q 21/28
2020/0411954 A1* 12/2020 Jia ...................... H01Q 15/0026
2021/0021038 A1* 1/2021 Tsuchiya ................ H01Q 23/00
2021/0057818 A1* 2/2021 Chi ........................ H01Q 5/364
2022/0085493 A1* 3/2022 Jia ........................ H01Q 21/065
2022/0166128 A1* 5/2022 Lee .......................... H01Q 1/36
2023/0025983 A1* 1/2023 Huang ................. H01Q 15/006
2023/0092046 A1* 3/2023 Lim ......................... H01Q 1/24 343/702
2023/0110878 A1* 4/2023 Hiramatsu ............... H01Q 5/40 343/702
2023/0261362 A1* 8/2023 Compton ............. H01Q 9/0485 343/785
2023/0275349 A1* 8/2023 Hiramatsu ............... H01Q 5/35 343/702
2023/0370536 A1* 11/2023 Yueh ..................... H04M 1/026
2024/0250428 A1* 7/2024 Nagai .................... H01Q 1/273

FOREIGN PATENT DOCUMENTS

EP 2070157 B1 * 10/2017 ............... H01Q 1/38
JP 2007235287 A * 9/2007
WO WO-2015029327 A1 * 3/2015 ............... H01F 1/26
WO WO-2017137224 A1 * 8/2017 ............. H01L 23/66

OTHER PUBLICATIONS

Rahmat-Samil et al. (2001) ‘Electromagnetic Band-Gap Structures: Classification, characterization, and applications’, 11th International Conference on Antennas and Propagation (ICAP 2001) [Preprint]. doi:10.1049/cp:20010350 (Year: 2001).*

Bayat-Makou et al. (2019) ‘Single-layer substrate-integrated broadside leaky long-slot array antennas with embedded reflectors for 5G Systems’, IEEE Transactions on Antennas and Propagation, 67(12), pp. 7331-7339. doi: 10.1109/tap.2019.2930134 (Year: 2019).*

Sam Goldheart et al., “Google Pixel 4 XL Teardown,” [online] https://www.ifixit.com/Teardown/Google+Pixel+4 +XL+Teardown/127320, Oct. 24, 2019, total 13 pages, XP55744213.

* cited by examiner

ADAPTIVE MMWAVE ANTENNA RADOME

PRIORITY CLAIM

This application is a national phase filing under section 371 of PCT Application No. PCT/US2020/021991, filed on Mar. 11, 2020 and entitled "Adaptive MMWave Antenna Radome," which is hereby incorporated by reference herein as if reproduced in its entirety.

TECHNICAL FIELD

This disclosure relates to an adaptive mmWave antenna radome, for example, for 5G mmWave communications.

BACKGROUND

Various emerging applications, e.g., virtual reality (VR), augmented reality (AR), big data analytics, artificial intelligence (AI), three-dimensional (3D) media, ultra-high definition transmission video, etc. have entered the world and created a significant growth in the data volume of wireless networks. 5G will expand spectrum usage to both below 6 GHz and above 24 GHz (which is known as mmWave) and open up a large amount of bandwidth for high data rate and capacity. However, Long-Term Evolution (LTE) still provides important support for the 5G experience by providing a wide coverage layer for emerging 5G networks during early years of 5G deployments. There will be a long period of time of co-existence of 2G/3G/4G LTE with 5G New Radio (NR) antennas and mmWave antennas inside of the same mobile device along with GPS and other connectivity antennas such as WIFI, Bluetooth, and near field communications (NFC) antennas.

SUMMARY

The present disclosure relates to an adaptive mmWave antenna radome, for example, for 5G mmWave communications.

A first aspect relates to a device comprising: a device cover; and an antenna system underneath the device cover, wherein the device cover is separated from the antenna system; and wherein the device cover comprises a perfect magnetic conductor (PMC) equivalent material surrounding the antenna system without overlapping the antenna system.

A second aspect relates to a device cover, the device cover comprising: a substrate, a first surface of the substrate facing an antenna system underneath the substrate, and the substrate being separated from the antenna system; and a perfect magnetic conductor (PMC) equivalent material disposed on a first surface of the substrate, the equivalent material surrounding the antenna system without overlapping the antenna system.

A third aspect relates to a mobile phone, the mobile phone comprising: a mobile phone cover; and an antenna system underneath the mobile phone cover, wherein the mobile phone cover is separated from the antenna system; and wherein the mobile phone cover comprises a perfect magnetic conductor (PMC) equivalent material surrounding the antenna system without overlapping the antenna system.

A fourth aspect relates to a method of controlling electromagnetic (EM) waves generated by an antenna system of a device, comprising emitting EM waves with an antenna system; and controlling the emitted EM with a device cover positioned above and separated from the antenna system, the device cover comprising a perfect magnetic conductor (PMC) equivalent material surrounding the antenna system without overlapping the antenna system.

A fifth aspect relates to a method of providing a device configured to control electromagnetic (EM) waves, the method comprising positioning a device cover above and separated from an antenna system configured to emit EM waves, wherein the device cover comprises a perfect magnetic conductor (PMC) equivalent material surrounding the antenna system without overlapping the antenna system.

The foregoing and other described aspects can each, optionally, include one or more of the following implementations:

In a first implementation, the device cover comprises a dielectric device cover.

In a second implementation, the antenna system comprises one or more antenna system elements.

In a third implementation, the antenna system comprises an antenna in package (AiP), an antenna on board (AoB), or an antenna in Module (AiM).

In a fourth implementation, the antenna system comprises one or more antennas in mmWave frequencies.

In a fifth implementation, the device cover serves as a superstrate of the antenna system, and the PMC equivalent material is disposed on a surface of the device cover facing towards the antenna system.

In a sixth implementation form, wherein the PMC equivalent material is of a width equal to or larger than $\lambda_d/2$ wherein $\lambda_d$ is an effective wavelength of a guided wave in the device cover.

In a seventh implementation, the PMC equivalent material has a structure that supresses microwaves (e.g., up to 300 MHz in frequency) inside of the device cover.

In an eighth implementation, the structure comprises an Electromagnetic Band Gap (EBG) or Photonic Band Gap (PBG) structure.

In a ninth implementation, the PMC equivalent material comprises a pluraltiy of holes in a dielectric substrate, wherein a shape and dimension of the pluraltiy of holes are determined based on dielectric parameters of the device cover and a distance between the device cover and the antenna system.

In a tenth implementation, the mobile phone cover comprises a mobile phone front cover that covering a front side of the mobile phone, the front side comprising a screen of the moible phone.

In an eleventh implementation, the mobile phone cover comprises a mobile phone back cover that covering a back side of the mobile phone, the back side opposing a screen of the moible phone.

In a twelfth implementation, the mobile phone cover comprises a mobile phone side or edge cover that covering a side or edge of the mobile phone, wherein the side or edge of the mobile phone being peripheral to a screen of the moible phone.

In a thirteen implementation, the antenna system is perpendicularly mounted on a ground plane of the device, and the device cover covers the antenna system and the ground plane.

In a fourteenth implementation, the EM waves comprises one or more guided waves inside of the device cover or surface waves on the ground plane.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 3A:
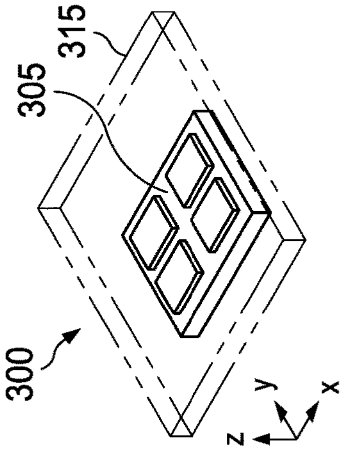
FIG. 3A is a schematic diagram illustrating an example mmWave antenna system underneath a finite device cover in free space, according to an implementation.

The following detailed description describes an adaptive mmWave antenna radome, for example, for 5G mmWave communications and is presented to enable any person skilled in the art to make and use the disclosed subject matter in the context of one or more particular implementations.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail inasmuch as such details are within the skill of one of ordinary skill in the art. The present disclosure is not intended to be limited to the described or illustrated implementations, but to be accorded the widest scope consistent with the described principles and features.

In a wireless communications system, especially with the development of a 5G system, a mobile phone may need to accommodate more and more 2G/3G/4G LTE, as well as 5G New Radio (NR) antennas and mmWave antennas. The area left for antennas can be limited due to the fact that industrial design (ID) of phones becomes slimmer on thickness and its bezel area becomes smaller while the display becomes bigger.

In some implementations, unlike the sub 6 GHz antenna normally implemented as a single antenna element, a mobile phone can include an antenna system or antenna module that includes one or more antenna elements. For example, a phase antenna array can be used in mmWave frequency to achieve higher gain and beamforming scanning to compensate high signal attenuation during propagation through air interfaces. The antenna system can be, for example, an antenna in package (AiP), an antenna on board (AoB), or an antenna in Module (AiM). Antenna in package (AiP) is currently a mainstream format for 5G mmWave antenna module. However, the standard AiP antenna design and calibration are based on characteristics of the AiP in free space for mass production purposes. However, when the AiP is placed inside a device (e.g., a mobile phone), a device cover (e.g., a phone back cover, a phone front cover, or a side or edge cover) with high dielectric constant (DK) material such as glass might have significant impacts on the antenna performance. Moreover, multiple AiP modules might be used in a single device, and the surroundings of the antenna system can be even more complicated and different from that in free space, especially when the size of the phone is getting thinner and the distance between the device cover and the antenna system becomes smaller.

For example, a device cover is typically bigger than 10 times the size of an AiP. The device cover with such a large size above the AiP can cause guided waves inside the device cover to be uncontrollable, rather than focusing on an intended radiation direction. In some implementations, as a distance between the device cover and the AiP becomes closer, the main beam of an antenna beam pattern of the AiP becomes narrower and the sidelobe of the antenna beam pattern of the AiP becomes higher. In one implementation, when the distance between the AiP and the glass cover increases to or becomes larger than 3.8 mm, the beam pattern of the AiP becomes similar to the one in free space. However, most devices are limited on thickness and the antenna system with conventional devices experience degraded antenna performances.

The disclosure provides techniques for solving the above problems. The described antenna system can help improve or optimize antenna performances of mmWave antenna systems (e.g., a standardized AiP) under different circumstances for mmWave communications. For example, the described techniques can help a standardized AiP achieve or approach an optimal antenna performance when AiP is under a dielectric cover of a device. The described techniques allow design and implementation of an adaptive mmWave antenna radome system. In some implementations, an adaptive mmWave antenna radome system can include a device cover and an antenna system underneath the device cover, wherein the device cover is separated from the antenna system (e.g., with a distance less than 3.8 mm) and wherein the device cover includes a PMC (perfect magnetic conductor) equivalent material surrounding the antenna system without overlapping the antenna system.

In some implementations, instead of physically truncating the device cover, the PMC equivalent material can be used to form a PMC boundary condition that can electronically truncate the device cover to a finite size similar to an antenna array aperture. As such, the guided wave inside of the device cover as well as the antenna aperture size can be controlled, so that the antenna performance can be less affected by the surrounding environment such as the device dielectric covers. The PMC equivalent material on the device cover can help form an mmWave antenna radome that is adapted to the surrounding environment of the antenna, such as, the device dielectric cover. In some implementations, the PMC equivalent material can form a loop, a closed path, a U shape, or another different shape (e.g., as a frame, ring, band, etc.) surrounding the antenna and have different dimensions (e.g., length, width, and thickness). In some implementations, the width of the shape along the device dielectric cover formed by the PMC equivalent material is equal to or larger than $\lambda_d/2$, wherein $\lambda_d$ is an effective wavelength of a guided wave in the device cover.

For example, a PMC equivalent material can be used to form a PMC boundary condition surface that is at least $\lambda_d/2$ wide to surround an AiP underneath a back cover of a mobile phone. The PMC boundary condition surface can effectively function as a magnetic conductor over a certain frequency range. The PMC boundary condition surface can electronically truncate the back cover to a finite size similar to the antenna array aperture. The PMC boundary condition surface effectively helps form an antenna radome for the AiP underneath the back cover of the mobile phone.

A PMC equivalent material can be an artificial electromagnetic (EM) material that can achieve or approximate a PMC boundary condition that has high impedance and is nearly lossless. A PMC equivalent material can be implemented using an artificial EM material with different structures, such as, an electromagnetic band gap (EBG) structure or a photonic bandgap (PBG) structure. PBG structures are generally infinite periodic structures of dielectric materials that prevent propagation of EM waves at certain frequencies. For finite rather than infinite PBG structures, the propagating signal is attenuated over a specified frequency band. Although "photonic" refers to light, the principle of "bandgap" applies to electromagnetic waves of all wavelengths. PBGs provide some degree of three-dimensional control of the propagation of EM waves. In some implementations, truly three-dimensional PBGs are needed for full control via the effects of PBGs.

The described techniques also allow a co-design of an mmWave antenna system of a device and the dielectric cover of the device so as to implement a radome for the mmWave antenna system adaptive to different surroundings of the device. For example, various parameters of the PMC equivalent material (e.g., a structure, a dimension, etc.), the antenna (e.g., a type, a radiation pattern, etc.), the back cover (e.g., a type of material, a shape, size, etc.), and other factors in the surrounding environment can be designed or otherwise configured to optimize or otherwise improve antenna performance. For example, the PMC equivalent material can include multiple metallic elements, wherein a shape and dimension of each of the multiple metallic elements are determined based on dielectric parameters of the device cover and a distance between the device cover and the antenna system. In some implementations, the PMC equivalent material can include multiple holes in a dielectric substrate, wherein a shape and dimension of each of the multiple holes are determined based on dielectric parameters of the device cover and a distance between the device cover and the antenna system.

In some implementations, an antenna gain at 3-dB beamwidth can be achieved by an mmWave antenna system with an adaptive mmWave antenna radome compared to the one of the mmWave antenna system in free space. In some implementations, the described techniques enable mmWave antenna implementations inside of a compact mobile device (e.g., a 5G mobile device) to achieve an enhanced capacity in a multiple-input-multiple-output (MIMO) diversity system.

Figure 1A:
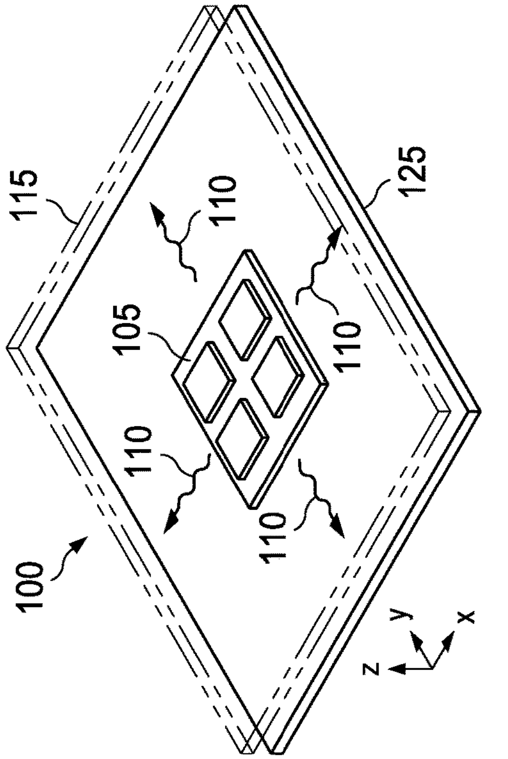
FIG. 1A is a schematic diagram illustrating an example mmWave antenna in package (AiP) underneath a glass cover, according to an implementation.
Figure 1B:
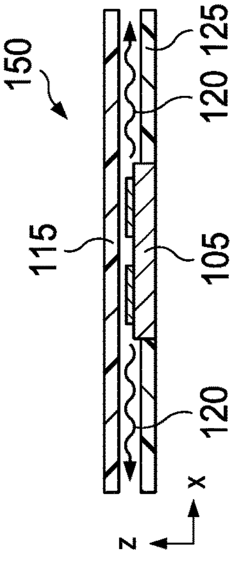
FIG. 1B is a schematic diagram illustrating a cross-sectional view of the example mmWave AiP underneath the glass cover.

FIG. 1A is a schematic diagram 100 illustrating an example mmWave AiP 105 underneath a glass cover 115, according to an implementation. FIG. 1B is a schematic diagram 150 illustrating a cross-sectional view of the example mmWave AiP 105 underneath the glass cover 115. In some implementations, the mmWave AiP 105 (e.g., an AiP antenna array) can be an example of an mmWave antenna system of a device (e.g., a mobile phone). The glass cover 115 can be an example of a dielectric cover of the device. For example, the glass cover 115 can be an example of a dielectric back cover of a mobile phone that extends beyond the example mmWave AiP 105 and forms an entirety of the back of the mobile phone. The mmWave AiP 105 is placed on a printed circuit board (PCB) 125. As such, the glass cover 115 can serve as a superstrate of the mmWave AiP 105, whereas the PCB 125 can serve as a ground plane or a substrate of the mmWave AiP 105.

In some implementations, the mmWave antenna system can excite guided waves inside of a dielectric cover of a device, especially when the dielectric cover has a relatively high DK (e.g., DK>3). As illustrated in FIGS. 1A-B, the mmWave AiP 105 excite the guided waves 110 inside of the glass cover 115. In some implementations, the guided waves 110 inside the glass cover 115 and surface waves 120 on the PCB 125 might foster each other's propagation. In some implementations, the guided wave (e.g., guided waves 110) inside of a dielectric cover enlarges an actual radiating aperture of the mmWave antenna system, causing the actual radiating aperture to be bigger than its radiating aperture would be in free space, which can result in narrower beamwidth and scanning capability of the mmWave antenna system.

Figure 2A:
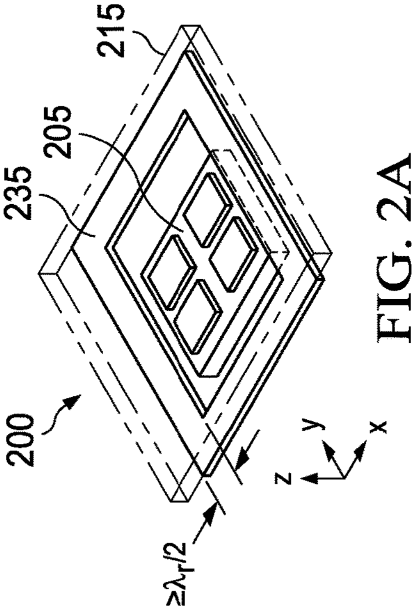
FIG. 2A is a schematic diagram illustrating an example adaptive mmWave antenna radome system, according to an implementation.
Figure 2B:
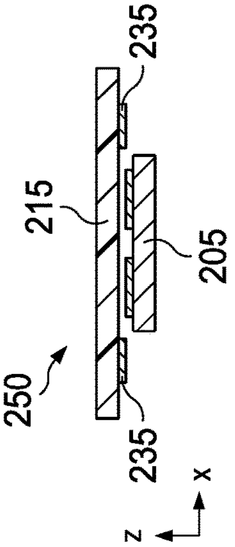
FIG. 2B is a schematic diagram illustrating a cross-sectional view of the example adaptive mmWave antenna radome system.

FIG. 2A is a schematic diagram illustrating an example adaptive mmWave antenna radome system 200, according to an implementation. FIG. 2B is a schematic diagram 250 illustrating a cross-sectional view of the example adaptive mmWave antenna radome system 200. In some implementations, the adaptive mmWave antenna radome system 200 includes an example mmWave antenna system 205 underneath a device cover 215 and a PMC surface 235 included on the device cover 215. The device cover 215 is separated from the example mmWave antenna system 205 in a first dimension (i.e., the vertical direction along the z-axis in this example) with a distance less than 3.8 mm. In some implementations, the distance between the device cover 215 and the mmWave antenna system 205 can be 3 mm or less. As such, the PMC surface 235 and the example mmWave antenna system 205 are not on the same plane but are separated in the first dimension as well.

In some implementations, the mmWave antenna system 205 can be an mmWave AiP 205 (e.g., an AiP antenna array), an mmWave AoB, or an mmWave AiM. In some implementations, the antenna system can include one or more antennas configured to operate in mmWave frequency.

The device cover 215 can be an example of a dielectric cover of a device (e.g., a mobile phone). In some implementations, the mobile phone cover can be a mobile phone front cover covering a front side of the mobile phone, wherein the front side includes a screen (e.g., a touch screen or a display) of the moible phone. In some implementations, the mobile phone cover can be a mobile phone back cover covering a back side of the mobile phone, wherein the back side opposing a screen of the moible phone. In some implementations, the dielectric cover can be, for example, a dielectric back cover of a mobile phone that extends beyond the example mmWave antenna system 205 and forms an entirety of the back of the mobile phone. For example, the device cover 215 can be a glass cover similar to the glass cover 115 in FIGS. 1A-B. The device cover 215 can serve as a superstrate of the mmWave antenna system 205. The device cover 215 can include a substrate (e.g., a glass substrate), wherein a first surface (e.g., an inner surface) of the substrate facing the mmWave antenna system 205 underneath the substrate. The substrate is separated from the mmWave antenna system 205 in the first dimension (i.e., the vertical direction along the z-axis in this example).

In some implementations, a PMC equivalent material can be disposed, deposited, placed, or othewise included on the device cover 215. For example, the PMC equivalent material can be disposed on the first surface of the substrate of the device cover 215, facing towards the mmWave antenna system 205. In some implementations, the thickness or height of the PMC material is significantly less than its length and width along the first surface of the substrate of the device cover 215, forming a PMC surface 235 surrounding the mmWave antenna system 205. The PMC surface 235 underneath the device cover 215 can be used to suppress the guided wave (e.g., microwaves up to 300 MHz in frequency) inside the device cover 215, reducing or eliminating energies going in unwanted directions.

Figure 3B:
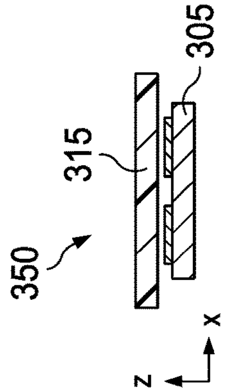
FIG. 3B is a schematic diagram illustrating a cross-sectional view of the example mmWave antenna system underneath the finite device cover.

Effectively, the PMC surface 235 helps form an adaptive mmWave antenna radome of the adaptive mmWave antenna radome system 200. For example, the PMC surface 235 can in effect electronically truncate the device cover 215 that forms an entirety of the back of the mobile phone and that would have had uncontrollable guided waves (such as the guided waves 110 shown in FIGS. 1A-B) to a finite device cover 315 that has a similar size to an actual antenna array aperture of the mmWave antenna system 305 in free space, as shown in FIGS. 3A-B. In some implementations, the example adaptive mmWave antenna radome system 200 as shown in FIGS. 2A-B can be similar or substantially equivalent to the example mmWave antenna system 305 as shown in FIGS. 3A-B, in terms of the performance of the antenna system. Specifically, FIG. 3A is a schematic diagram 300 illustrating the example mmWave antenna system 305 underneath a finite device cover 315 in free space, according to an implementation. FIG. 3B is a schematic diagram 350 illustrating a cross-sectional view of the example mmWave antenna system 305 underneath the finite device cover 315. The finite device cover 315 does not extend beyond what has been shown in FIGS. 3A-3B and does not form an entirety of the mobile device. The finite device cover 315 has a similar size to the actual antenna array aperture of the mmWave antenna system 305 in free space.

As illustrated in FIG. 2A, the PMC surface 235 has a rectangular frame shape with a width along the first surface of the substrate of the device cover 215. The width can be equal to or larger than $\lambda_d/2$, wherein $\lambda_d$ is an effective wavelength of a guided wave in the device cover 215. The PMC surface 235 can have another shape and have different dimensions. In some implementations, the PMC surface 235 and the mmWave antenna system 205 can be co-designed, for example, by selecting the type of the PMC equivalent material, the shape and dimensions (length, width, and depth) of the PMC surface, and configurations of the mmWave antenna system 205 to improve or optimize the performance of the mmWave antenna system 205 underneath of the device cover 215 of the device. For example, the shape of the PMC surface 235 can be chosen to be the same as, similar to, or otherwise matching the shape of the mmWave antenna system 205. The size of the PMC surface 235 can be slightly larger than the size of the mmWave antenna system 205 so that the PMC surface 235 encloses or otherwise surrounds the mmWave antenna system 205. In some implementations, the PMC surface 235 can be as close as possible but not overlapping with the mmWave antenna system 205 along the first surface of the substrate of the device cover 215. For example, a lateral distance between the PMC surface 235 and the mmWave antenna system 205 can be $\lambda_d$ or less.

Figure 4A:
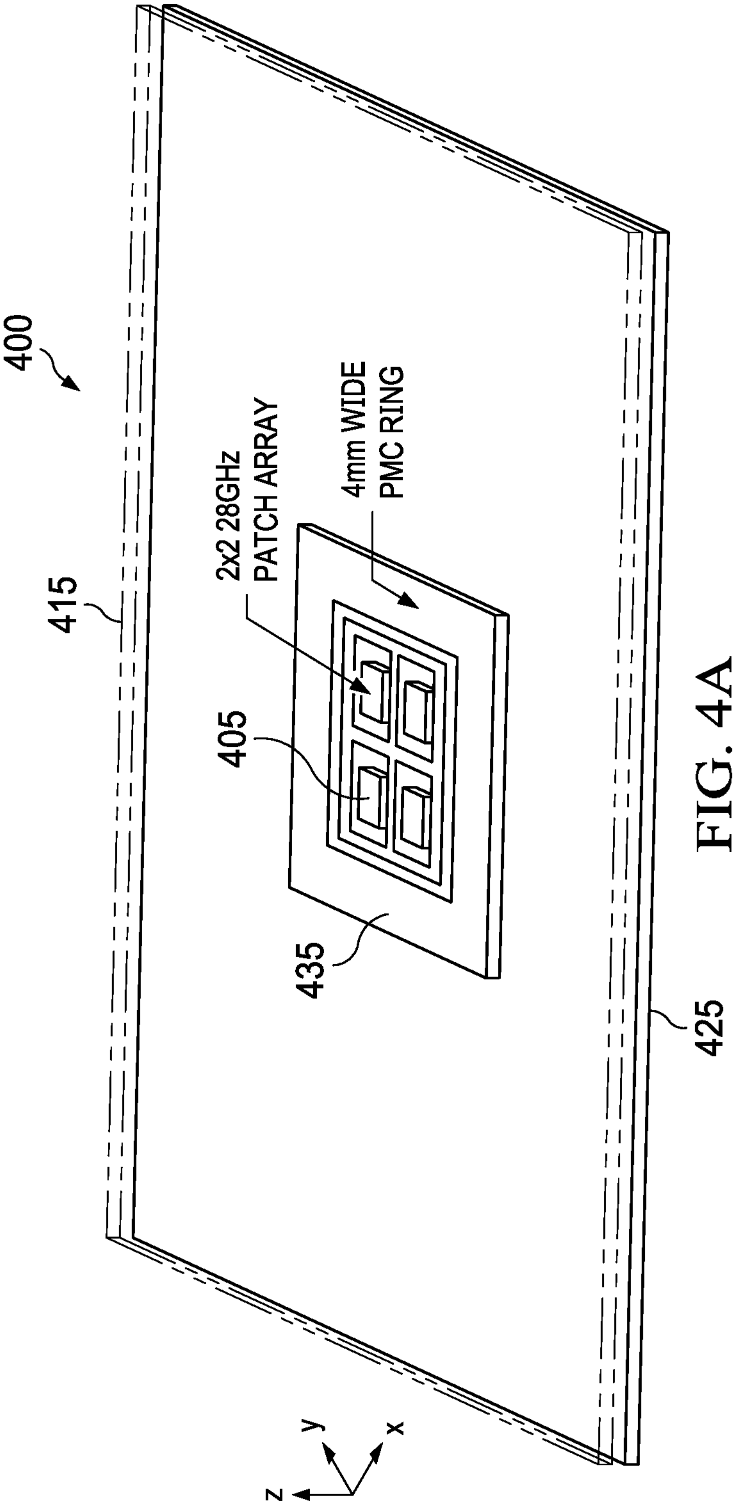
FIG. 4A is a schematic diagram illustrating an example adaptive mmWave antenna radome system, according to an implementation.
Figure 4B:
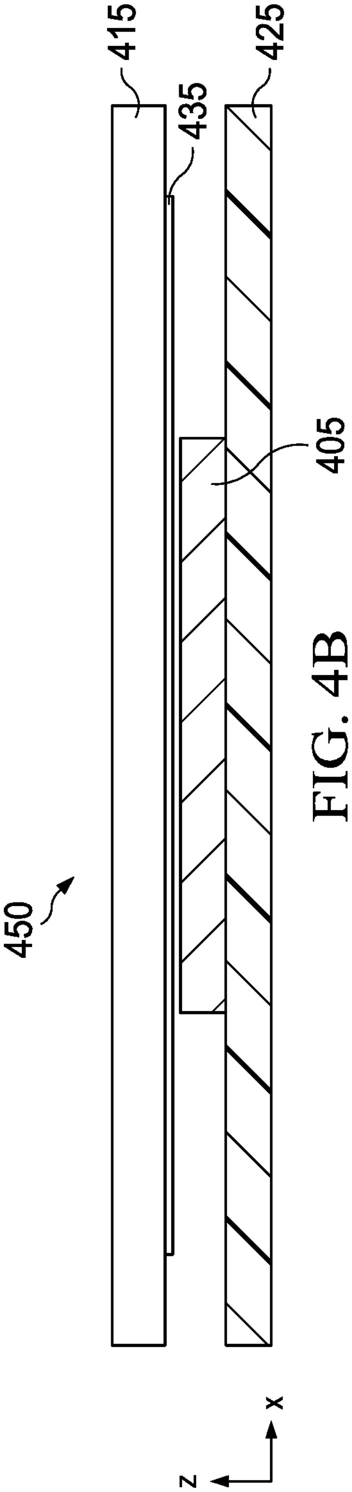
FIG. 4B is a schematic diagram illustrating a cross-sectional view of the example adaptive mmWave antenna radome system.

FIG. 4A is a schematic diagram illustrating an example adaptive mmWave antenna radome system 400, according to an implementation. FIG. 4B is a schematic diagram 450 illustrating a cross-sectional view of the example adaptive mmWave antenna radome system 400. In some implementations, the adaptive mmWave antenna radome system 400 includes an mmWave AiP 405 underneath a device cover 415 and a PMC ring 435 on the device cover 415 surrounding the mmWave AiP 405. The device cover 415 is separated from the mmWave AiP 405 in a first dimension (i.e., the vertical direction along the z-axis in this example). As such, the PMC ring 435 and the mmWave AiP 405 are not on the same plane but are separated in the first dimension as well.

The mmWave AiP 405 can be an example of an mmWave antenna system inside a device (e.g., a mobile phone), such as the mmWave antenna system 205. The device cover 415 can be an example of a dielectric cover of a device (e.g., a mobile phone). The dielectric cover can be, for example, a dielectric back cover of a mobile phone that extends beyond the example mmWave AiP 405 and forms an entirety of the back of the mobile phone. For example, the device cover 415 can be a glass cover similar to the glass cover 115 in FIGS. 1A-B. The mmWave AiP 405 is placed on a printed circuit board (PCB) 425. As such, the device cover 415 can serve as a superstrate of the mmWave AiP 405, whereas the PCB 425 can serve as a ground plane or a substrate of the mmWave AiP 405. As shown in FIG. 4A, the mmWave AiP 405 includes a 2×2 28 GHz antenna patch array. The mmWave AiP 405 is surrounded by the PMC ring 435. The PMC ring 435 has a width of 4 mm. Note that the PMC ring 435 surrounds but does not overlap with the mmWave AiP 405.

Figure 5A:
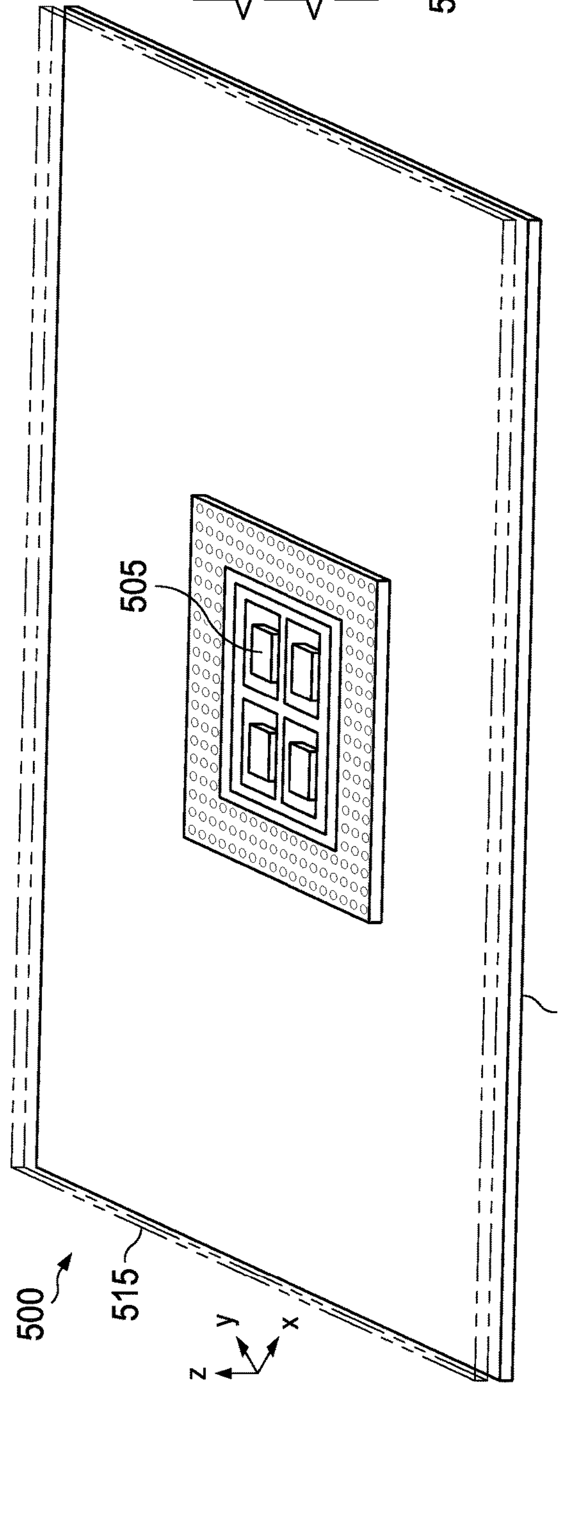
FIG. 5A is a schematic diagram illustrating an example adaptive mmWave antenna radome system, according to an implementation.
Figure 5D:
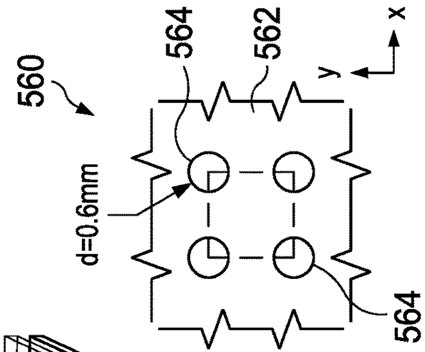
FIG. 5D is a schematic diagram illustrating a top view of an example structure of the PMC equivalent material that forms the PMC surface surrounding the example mmWave AiP, according to an implementation.
Figure 5B:
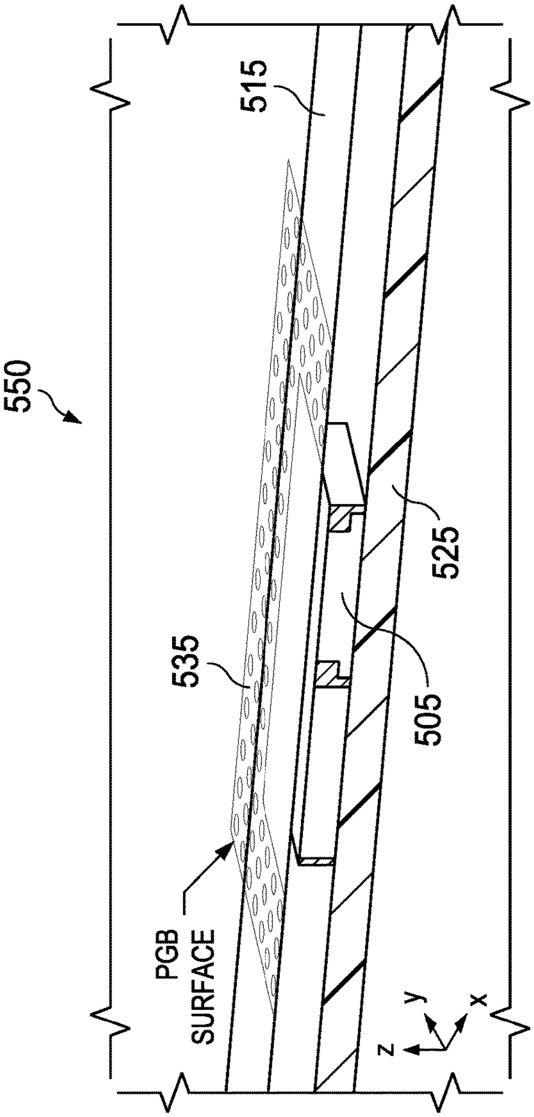
FIG. 5B is a schematic diagram illustrating a cross-sectional view of the example adaptive mmWave antenna radome system.
Figure 5C:
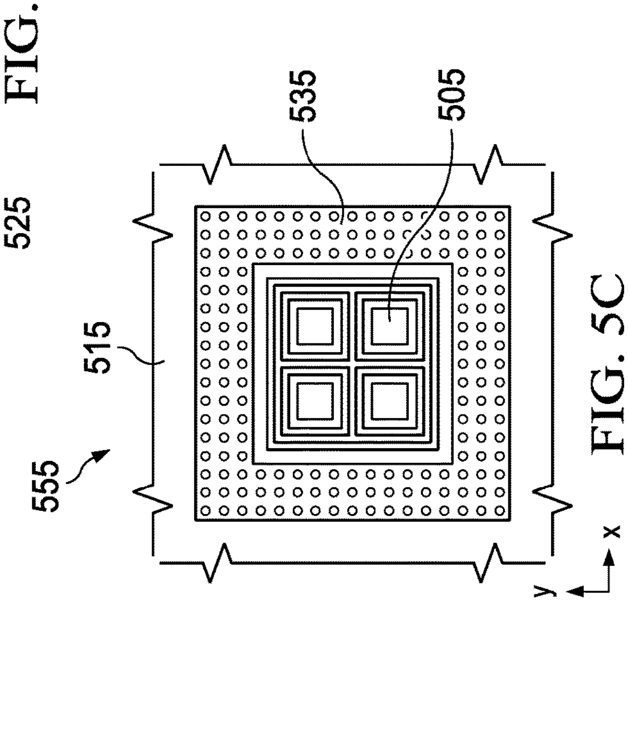
FIG. 5C is a schematic diagram illustrating a top view of the adaptive mmWave antenna radome system.

FIG. 5A is a schematic diagram illustrating an example adaptive mmWave antenna radome system 500, according to an implementation. The adaptive mmWave antenna radome system 500 includes an mmWave AiP 505 underneath a device cover 515 and a PMC equivalent material 560 that forms a PMC surface 535 surrounding the example mmWave AiP 505. FIG. 5B is a schematic diagram 550 illustrating a cross-sectional view of the example adaptive mmWave antenna radome system 500. FIG. 5C is a schematic diagram 555 illustrating a top view of the adaptive mmWave antenna radome system 500. FIG. 5D is a schematic diagram illustrating a top view of an example structure of the PMC equivalent material 560 that forms the PMC surface 535 surrounding the example mmWave AiP 505, according to an implementation.

The mmWave AiP 505 can be an example of an mmWave antenna system inside a device (e.g., a mobile phone), such as the mmWave antenna system 205. The device cover 515 can be an example of a dielectric cover of a device (e.g., a mobile phone). The dielectric cover can be, for example, a dielectric back cover of a mobile phone that extends beyond the example mmWave AiP 505 and forms an entirety of the back of the mobile phone. For example, the device cover 515 can be a glass cover similar to the glass cover 115 in FIGS. 1A-B. The mmWave AiP 505 is placed on a printed circuit board (PCB) 525. As such, the device cover 515 can serve as a superstrate of the mmWave AiP 505, whereas the PCB 525 can serve as a ground plane or a substrate of the mmWave AiP 505.

As shown in FIGS. 5B and 5C, the mmWave AiP 505 is surrounded by the PMC surface 535. As shown in FIG. 5D, the PMC surface 535 is made of a PMC equivalent material 565 with a PGB structure, where the PMC equivalent material 565 is constructed by drilling or etching spherical holes 564 in a dielectric material 562. In the example shown in FIG. 5D, the diameter of each of the circular holes 564 is 0.6 mm. The diameters of the circular holes 564 can have other values, for example, in the range of 0.3-0.8 mm. In some implementations, the diameter and placement of each of the spherical holes 564 can be designed or otherwise configured, for example, to optimize or otherwise improve the impedance or other properties of the PMC equivalent material 565 to better suppress guided waves in the device cover 515. In some implementations, a shape and dimension of each of the spherical holes 564 are determined based on dielectric parameters of the device cover 515 and a distance between the device cover 515 and the antenna system 505 in the first dimension (i.e., the vertical direction along the z-axis in this example).

Figure 6A:
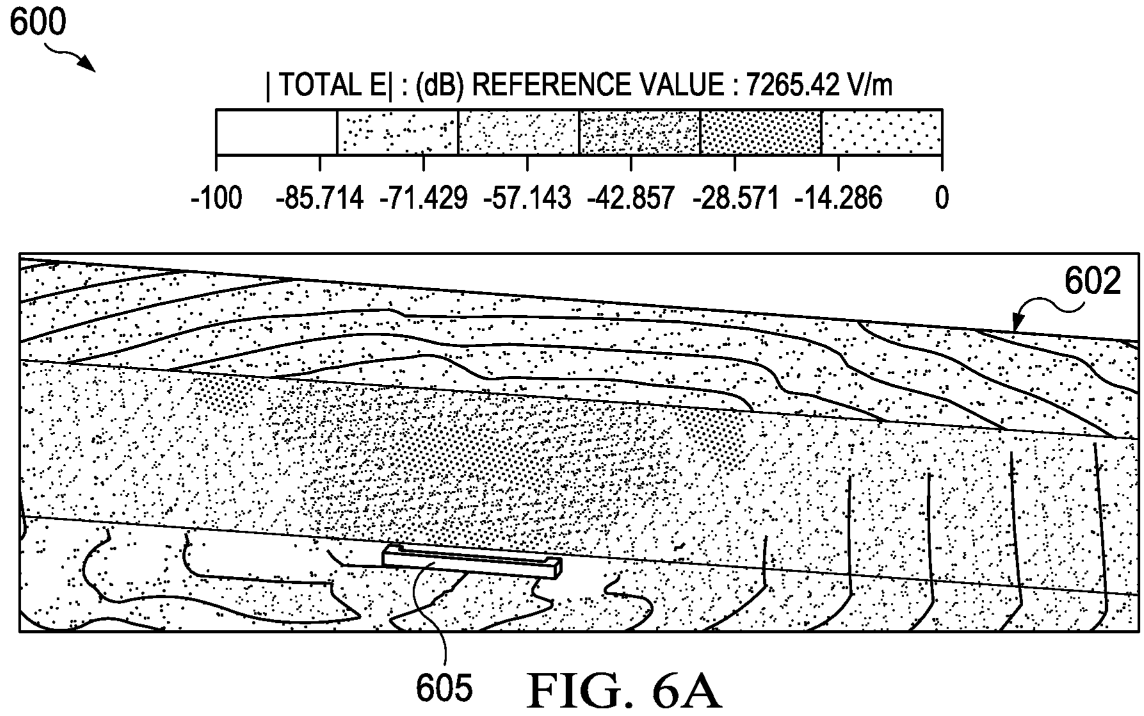
FIG. 6A is a plot illustrating an electric field (E-field) of an example 2×2 patch antenna array on a ground plane in free space without any device cover, according to an implementation.
Figure 6B:
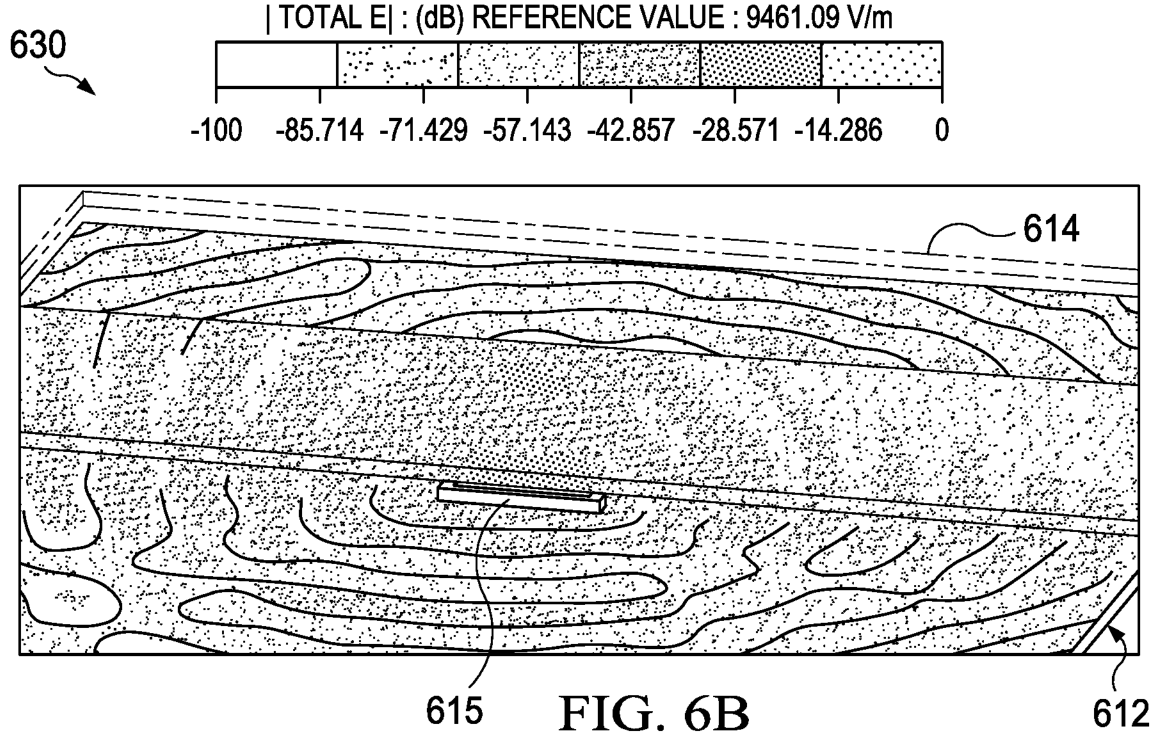
FIG. 6B is a plot illustrating an E-field of an example one patch antenna element on a ground plane under a glass cover, according to an implementation.
Figure 6C:
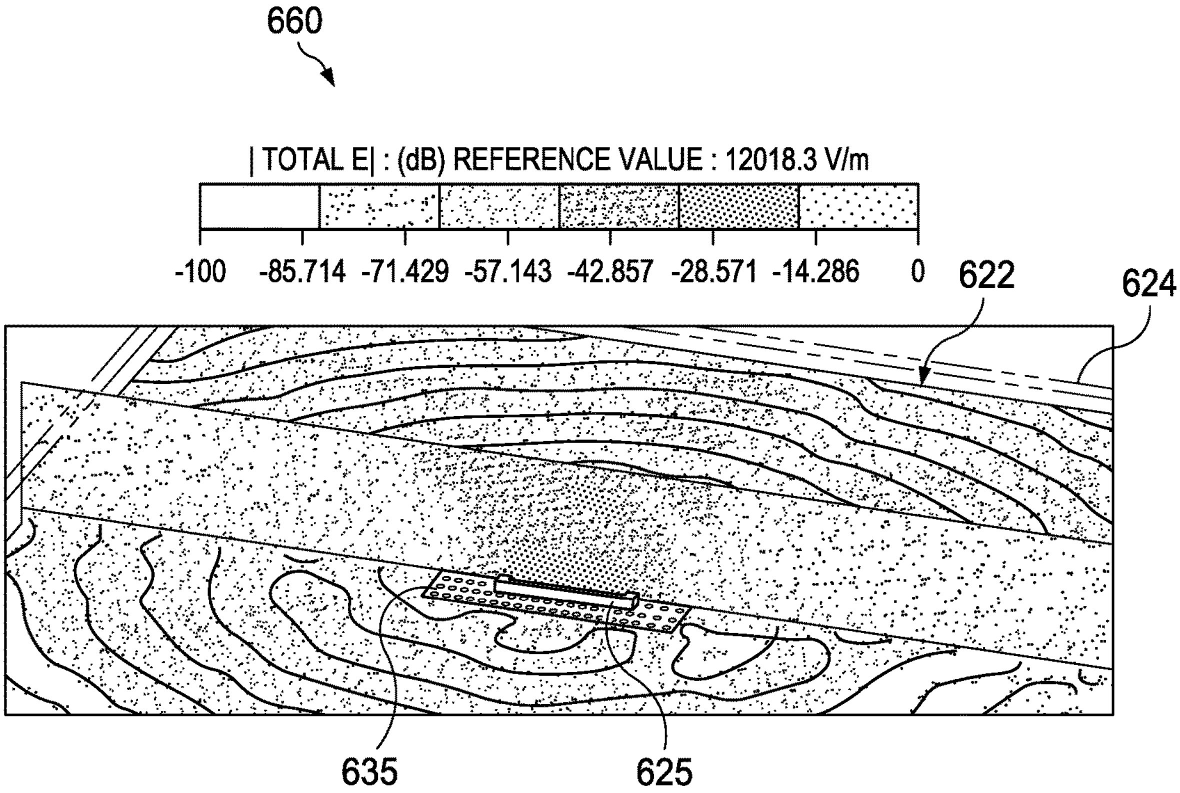
FIG. 6C is a plot illustrating an E-field of an example one patch antenna element on a ground plane under a glass cover with a PMC surface, according to an implementation.

FIG. 6A is a plot illustrating an electric field (E-field) 600 of an example 2×2 patch antenna array 605 on a ground plane 602 in free space without any device cover, according to an implementation. FIG. 6B is a plot illustrating an E-field 630 of an example one patch antenna element 615 on a ground plane 612 under a glass cover 614, according to an implementation. FIG. 6C is a plot illustrating an E-field 660 of an example one patch antenna element 625 on a ground plane 622 under a glass cover 624 with a PMC surface 635, according to an implementation. The PMC surface 635 surrounds but does not overlap with the one patch antenna element 625. The PMC surface 635 is formed by a PMC equivalent material with a PGB structure. As can be seen in FIGS. 6A-C, guided waves in the glass cover 624 and surface waves on the ground plane 622 can be partially suppressed with the PMC surface 635.

Figure 7A:
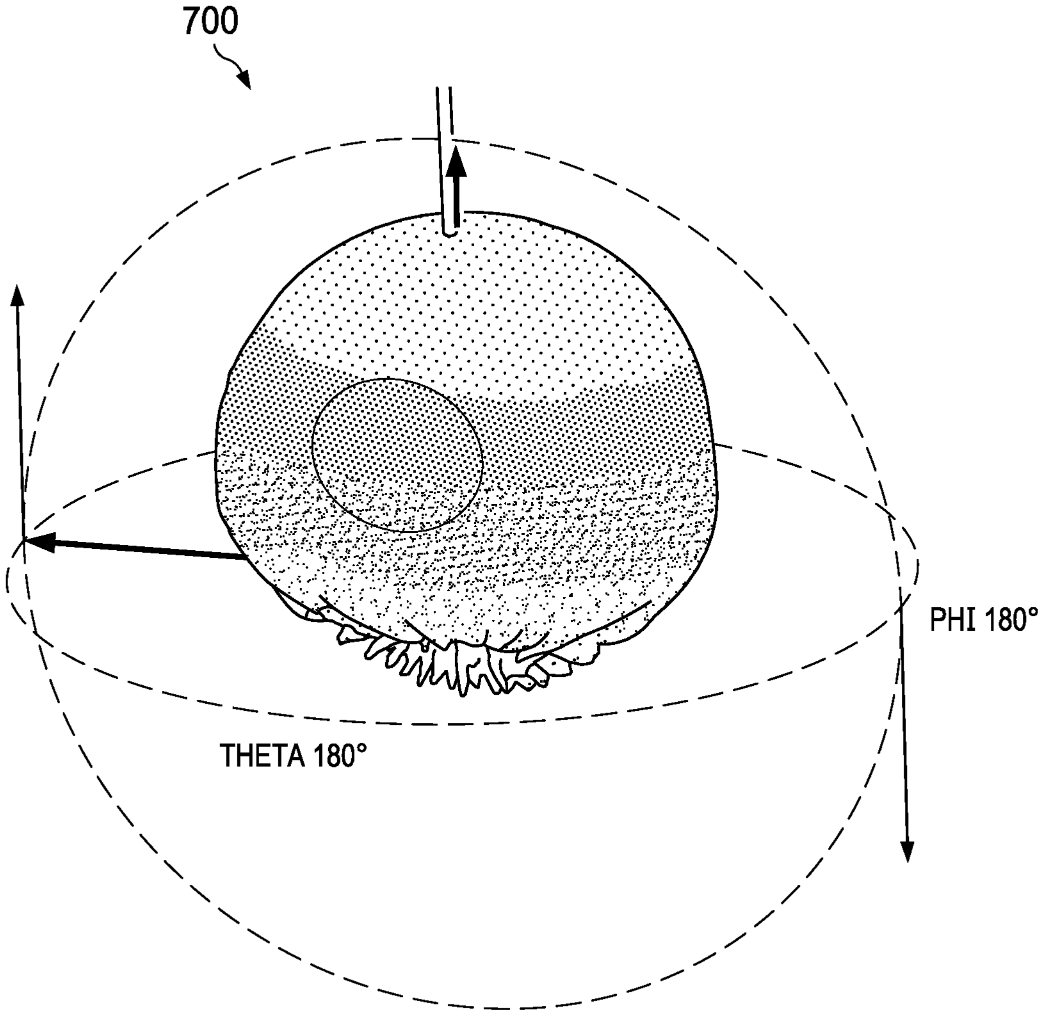
FIG. 7A is a plot illustrating an antenna gain pattern of an example AiP antenna array on a PCB ground plane in free space without any device cover, according to an implementation.
Figure 7B:
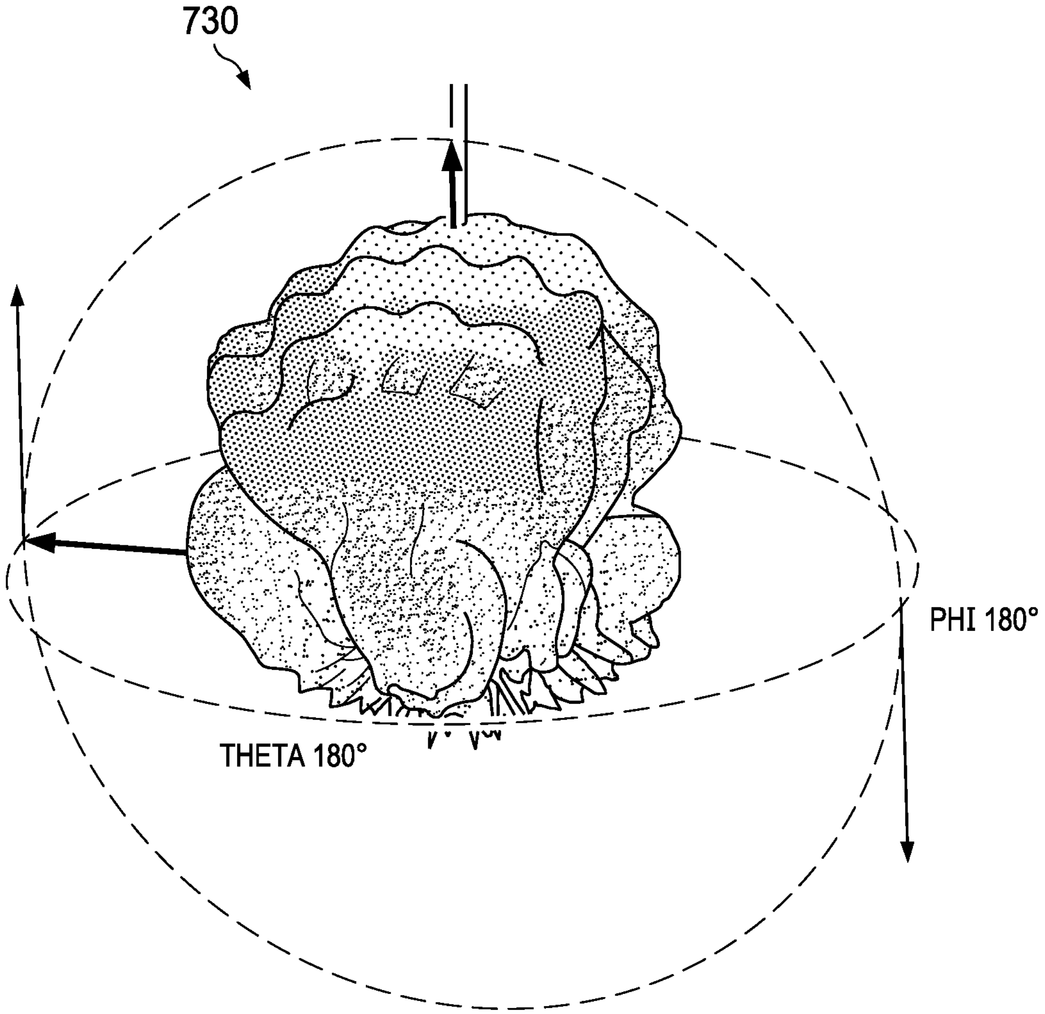
FIG. 7B is a plot illustrating an antenna gain pattern of an example AiP antenna array on a PCB ground plane under a glass cover, according to an implementation.
Figure 7C:
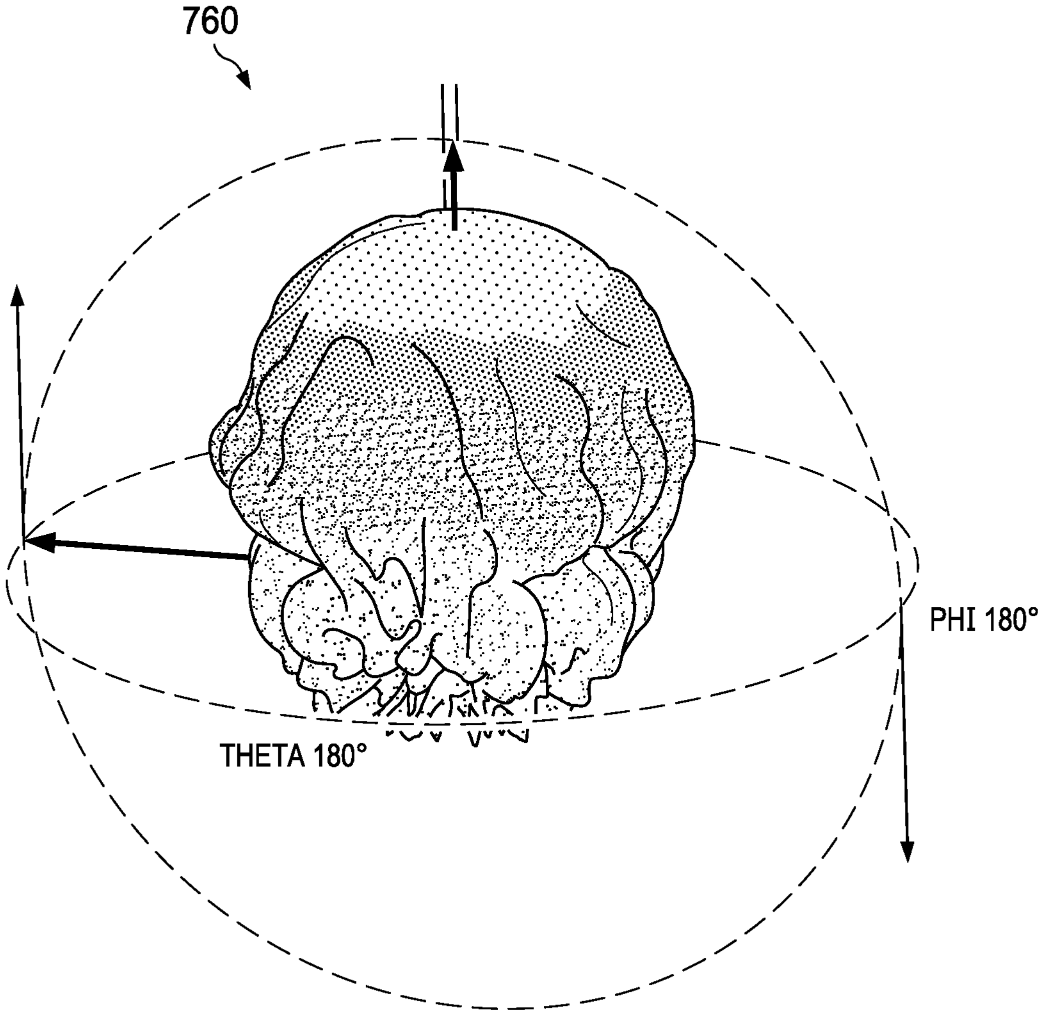
FIG. 7C is a plot illustrating an antenna gain pattern of an example AiP antenna array on a PCB ground plane under a glass cover with a PMC surface, according to an implementation.

FIG. 7A is a plot illustrating an antenna gain pattern 700 of an example AiP antenna array on a PCB ground plane in free space without any device cover, according to an implementation. The antenna gain pattern 700 shows a peak gain of 9.9 dB for the example AiP antenna array 705 on a PCB ground plane in free space without any device cover. FIG. 7B is a plot illustrating an antenna gain pattern 730 of an example AiP antenna array on a PCB ground plane under a glass cover, according to an implementation. The antenna gain pattern 730 shows a peak gain of 8.4 dB for the example AiP antenna array on the PCB ground plane under the glass cover. FIG. 7C is a plot illustrating an antenna gain pattern 760 of an example AiP antenna array on a PCB ground plane under a glass cover with a PMC surface, according to an implementation. The antenna gain pattern 760 shows a peak gain of 10.1 dB for the example AiP antenna array on the PCB ground plane under the glass cover with the PMC surface.

As can be seen in FIGS. 7A-C, with PMC equivalent material on the glass cover, there is 1.7 dB improvement on peak gain potential of the antenna gain pattern 760 of the example AiP antenna array under the glass cover with the PMC surface than that of the antenna gain pattern 730 of the example AiP antenna array under the glass cover without a PMC surface. Also, the antenna gain pattern 760 is much smoother than the antenna gain pattern 730. The antenna gain pattern 760 has less ripples and its side lobes are much lower than those of the antenna gain pattern 730 due to controlled reflection between the glass cover and the PCB ground plane.

Figure 8A:
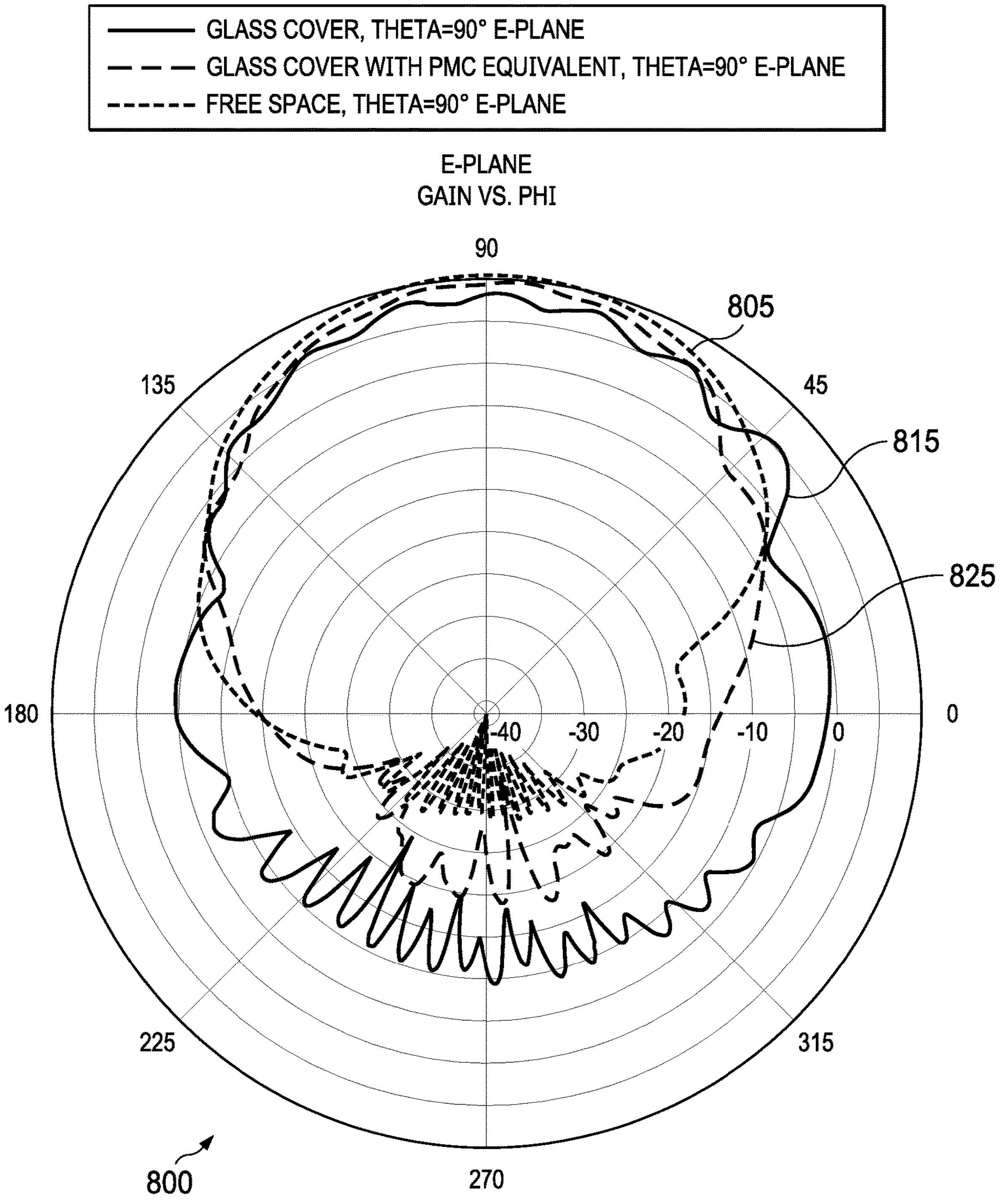
FIG. 8A is a plot illustrating a gain vs. angle pattern of an example AiP antenna array in free space without any device cover, a gain vs. angle pattern of an example AiP antenna array under a glass cover, and a gain vs. angle pattern of an example AiP antenna array under a glass cover with a PMC surface, in an E-field plane, according to an implementation.

FIG. 8A is a plot 800 illustrating a gain vs. angle pattern 805 of an example AiP antenna array in free space without any device cover, a gain vs. angle pattern 815 of an example AiP antenna array under a glass cover, and a gain vs. angle pattern 825 of an example AiP antenna array under a glass cover with a PMC surface, in an E-field plane, according to an implementation.

Figure 8B:
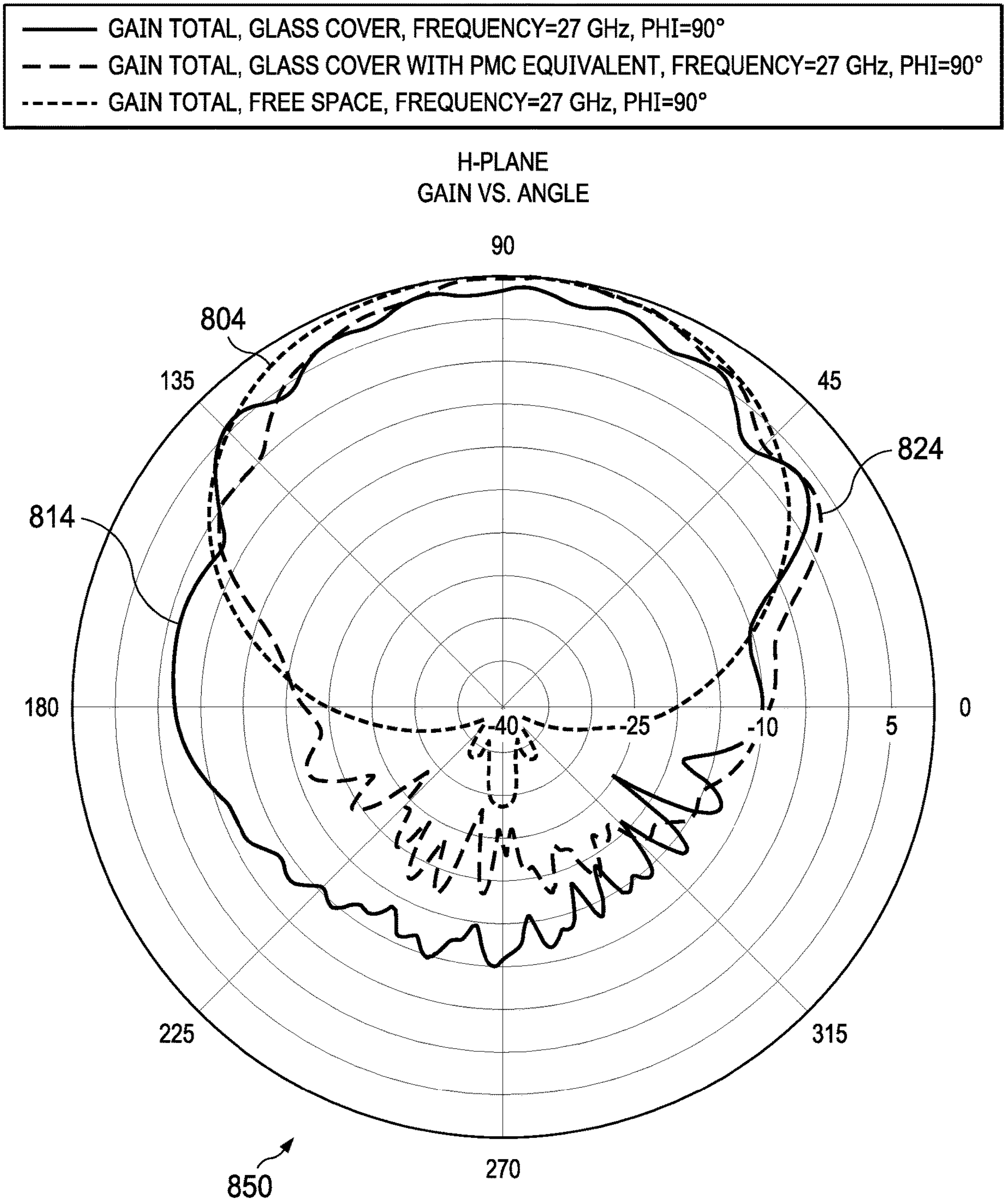
FIG. 8B is a plot illustrating a gain vs. angle pattern of an example AiP antenna array in free space without any device cover, a gain vs. angle pattern of an example AiP antenna array under a glass cover, and a gain vs. angle pattern of an example AiP antenna array under a glass cover with a PMC surface, in a magnetic field (H-field) plane, according to an implementation.

FIG. 8B is a plot 850 illustrating a gain vs. angle pattern 804 of an example AiP antenna array in free space without any device cover, a gain vs. angle pattern 814 of an example AiP antenna array under a glass cover, and a gain vs. angle pattern 824 of an example AiP antenna array under a glass cover with a PMC surface, in a magnetic field (H-field) plane, according to an implementation. The gain vs. angle patterns 805, 815, 825, 804, 814, and 824 are all measured at phi=90° at 28 GHz frequency.

As can be seen in FIGS. 8A-8B, side lobes and back lobes of the gain vs. angle patterns 825 and 824 of the example AiP antenna array under the glass cover with a PMC surface are closer to the counterpart patterns 805 and 804 in free space without any device cover, and are smoother than the counterpart patterns 815 and 814 of the example AiP antenna array under the glass cover without a PMC surface.

Figure 9D:
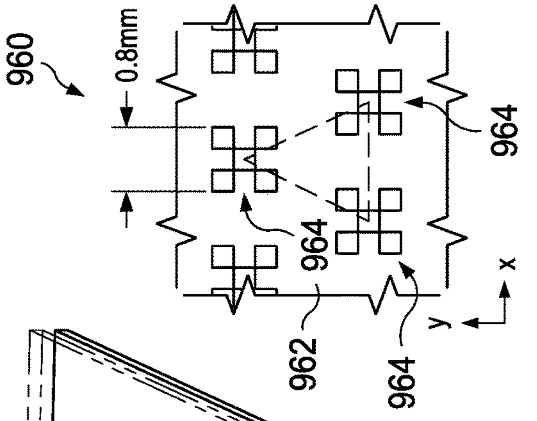
FIG. 9D is a schematic diagram illustrating a top view of an example structure of the PMC equivalent material that forms the PMC surface surrounding the example mmWave AiP, according to an implementation.
Figure 9A:
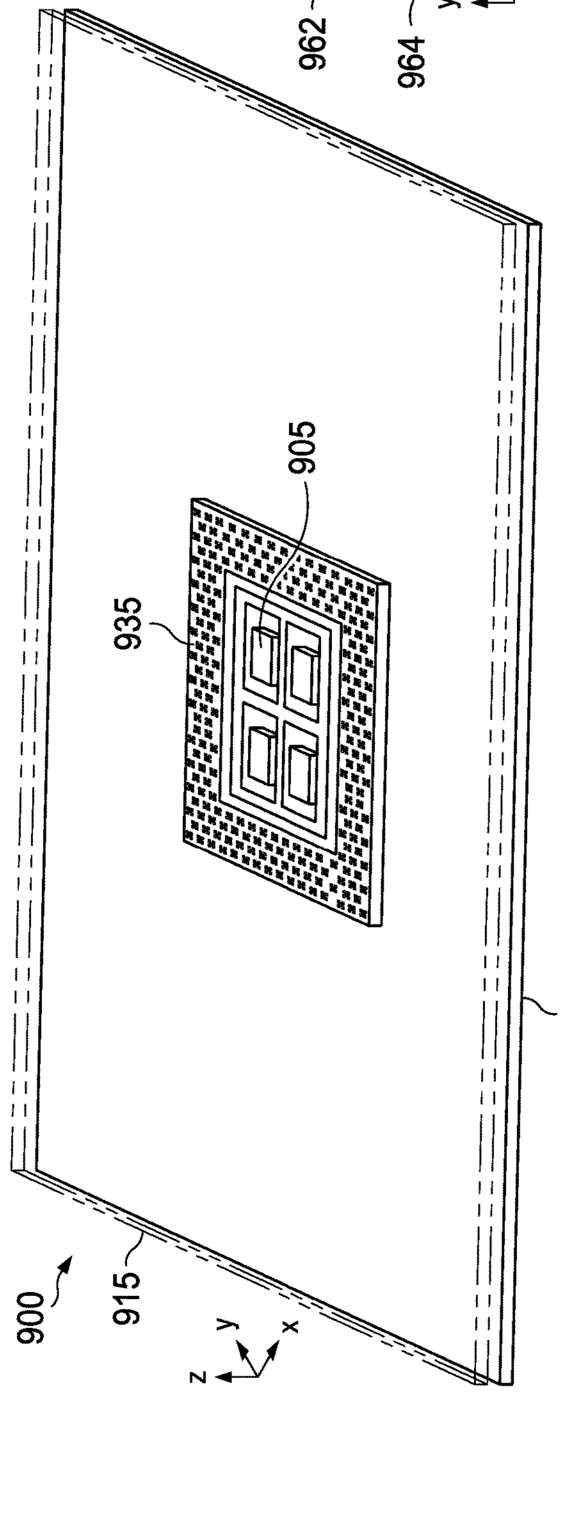
FIG. 9A is a schematic diagram illustrating another example adaptive mmWave antenna radome system, according to an implementation. The example adaptive mmWave antenna radome system includes an mmWave AiP underneath a device cover and a PMC equivalent material that forms a PMC surface surrounding the example mmWave AiP.

FIG. 9A is a schematic diagram illustrating another example adaptive mmWave antenna radome system 900, according to an implementation. The example adaptive mmWave antenna radome system 900 includes an mmWave AiP 905 underneath a device cover 915 and a PMC equivalent material 960 that forms a PMC surface 935 surrounding the example mmWave AiP 905.

Figure 9B:
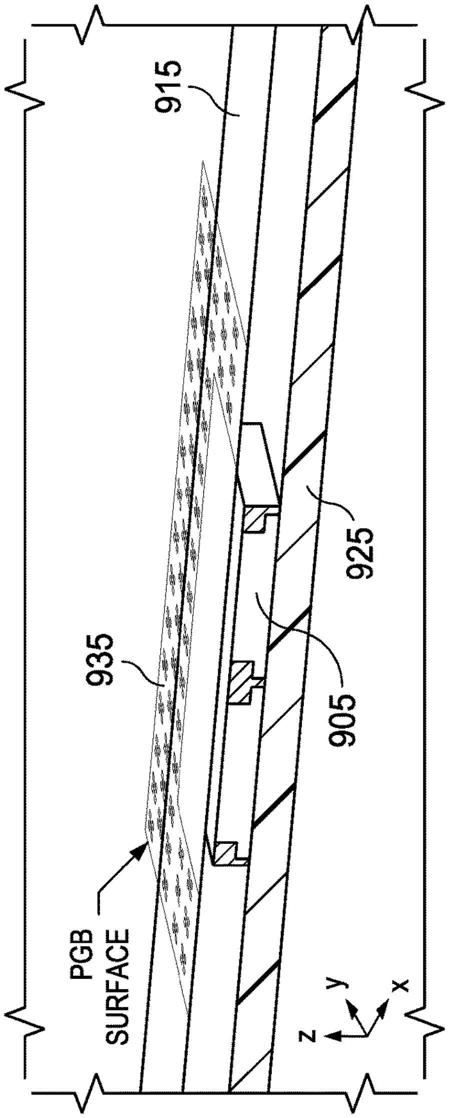
FIG. 9B is a schematic diagram illustrating a cross-sectional view of the example adaptive mmWave antenna radome system.
Figure 9C:
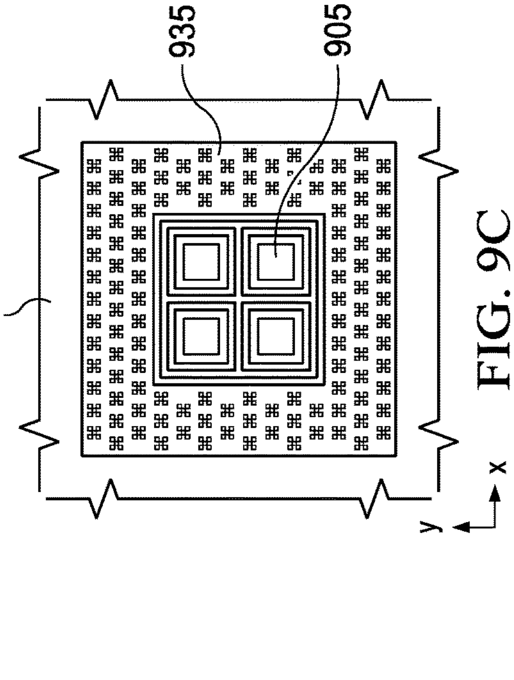
FIG. 9C is a schematic diagram illustrating a top view of the example adaptive mmWave antenna radome system.

FIG. 9B is a schematic diagram 950 illustrating a cross-sectional view of the example adaptive mmWave antenna radome system 900. FIG. 9C is a schematic diagram 955 illustrating a top view of the example adaptive mmWave antenna radome system 900. FIG. 9D is a schematic diagram illustrating a top view of an example structure of the PMC equivalent material 960 that forms the PMC surface 935 surrounding the example mmWave AiP 905, according to an implementation.

The mmWave AiP 905 can be an example of an mmWave antenna system inside a device (e.g., a mobile phone), such as the mmWave antenna system 205. The device cover 915 can be an example of a dielectric cover of a device (e.g., a mobile phone). The dielectric cover can be, for example, a dielectric back cover of a mobile phone that extends beyond the example mmWave AiP 905 and forms an entirety of the back of the mobile phone. For example, the device cover 915 can be a glass cover similar to the glass cover 115 in FIGS. 1A-B. The mmWave AiP 905 is placed on a printed circuit board (PCB) 925. As such, the device cover 915 can serve as a superstrate of the mmWave AiP 905, whereas the PCB 925 can serve as a ground plane or a substrate of the mmWave AiP 905.

As shown in FIGS. 9B and 9C, the mmWave AiP 905 is surrounded by the PMC surface 935 made of a PMC equivalent material 960. As shown in FIG. 9D, the PMC equivalent material 960 with a PGB structure, where the PMC equivalent material 969 has a periodic structure of rectangular holes 964 in a dielectric material 962. In the example shown in FIG. 9D, each of the rectangular holes 964 is arranged in a snow-flake shape with an outer contour of a length of 0.8 mm. The diameters of the circular holes 964 can have other values, for example, in the range of 0.6-1 mm. In some implementations, the dimension and placement of each hole 964 can be designed or otherwise configured, for example, to optimize or otherwise improve the impedance or other properties of the PMC equivalent material 960 to better suppress guided waves in the device cover 915.

Figure 10:
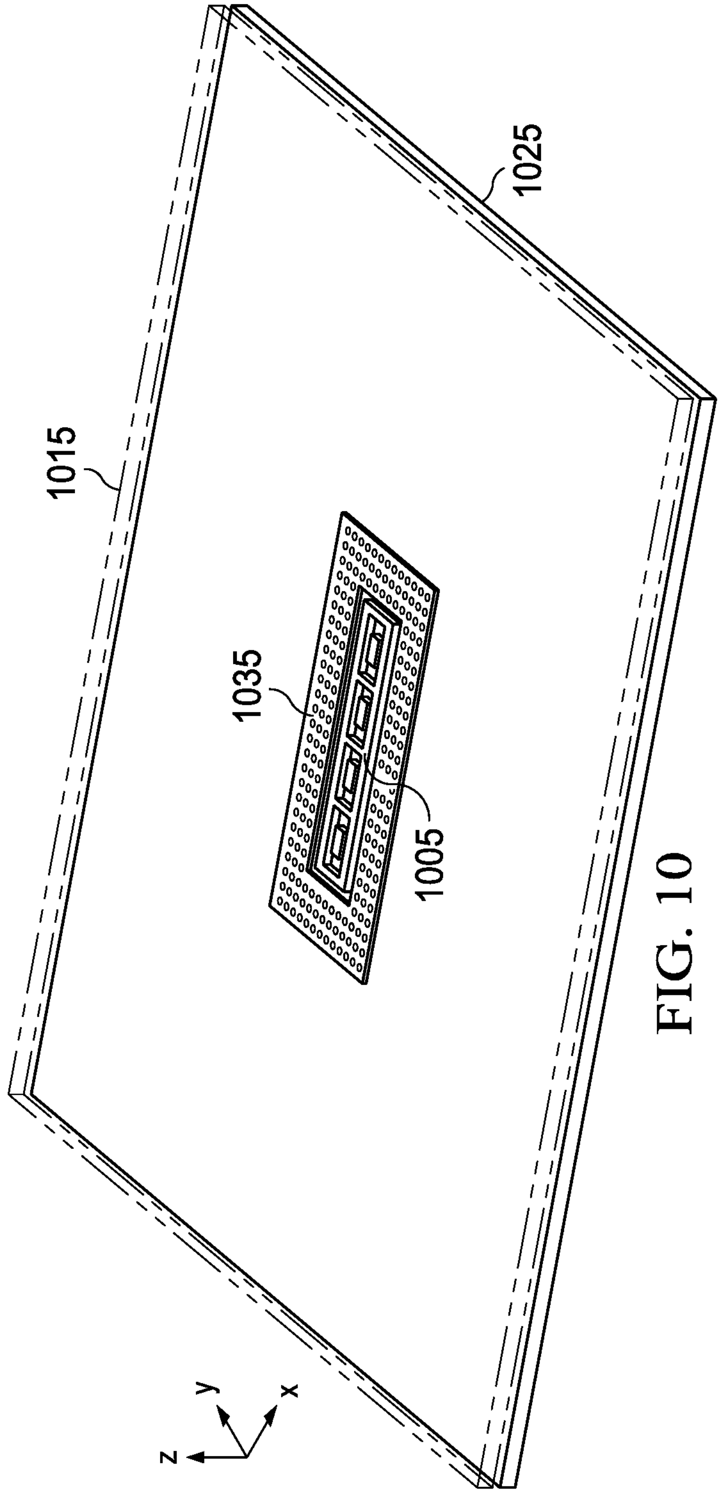
FIG. 10 is a schematic diagram illustrating another example adaptive mmWave antenna radome system, according to an implementation.

FIG. 10 is a schematic diagram 1000 illustrating another example adaptive mmWave antenna radome system 1000, according to an implementation. The example adaptive mmWave antenna radome system 1000 includes an mmWave AiP 1005 underneath a device cover 1015 and a PMC surface 1035 on the device cover 1015.

The mmWave AiP 1005 can be an example of an mmWave antenna system inside a device (e.g., a mobile phone), such as the mmWave antenna system 205. The mmWave AiP 1005 as shown includes 4 antenna elements. In some implementations, the mmWave AiP 1005 can include another number of antenna elements (e.g., 1, 2, 3, 5, 6, etc.) The device cover 1015 can be an example of a dielectric cover of a device (e.g., a mobile phone). The dielectric cover can be, for example, a dielectric back cover of a mobile phone that extends beyond the example mmWave AiP 1005 and forms an entirety of the back of the mobile phone. For example, the device cover 1015 can be a glass cover similar to the glass cover 115 in FIGS. 1A-B. The mmWave AiP 1005 is placed on a printed circuit board (PCB) 1025. As such, the device cover 1015 can serve as a superstrate of the mmWave AiP 1005, whereas the PCB 1025 can serve as a ground plane or a substrate of the mmWave AiP 1005. As shown in FIG. 10A, the mmWave AiP 1005 includes 4 antenna elements with 1×4 horizontal placement. The mmWave AiP 1005 is surrounded by the PMC surface 1035. Note that the PMC surface 1035 does not overlap with the mmWave AiP 1005.

Figure 11B:
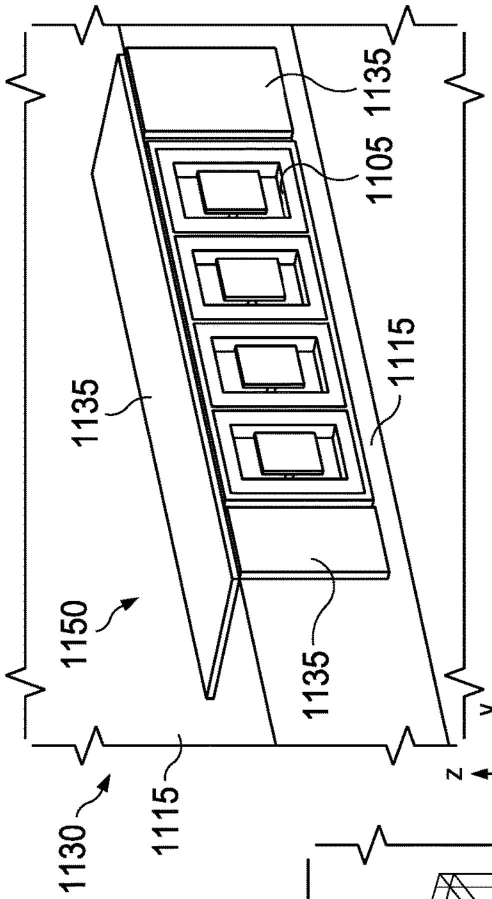
FIG. 11B is a schematic diagram illustrating a zoomed-in view of the example adaptive mmWave antenna radome system.
Figure 11C:
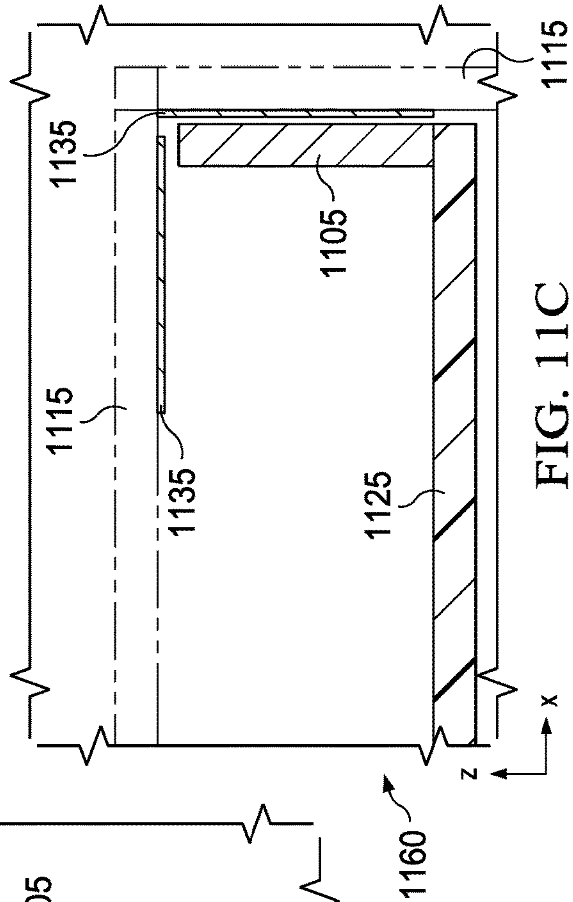
FIG. 11C is a schematic diagram illustrating a top view of the example adaptive mmWave antenna radome system.
Figure 11A:
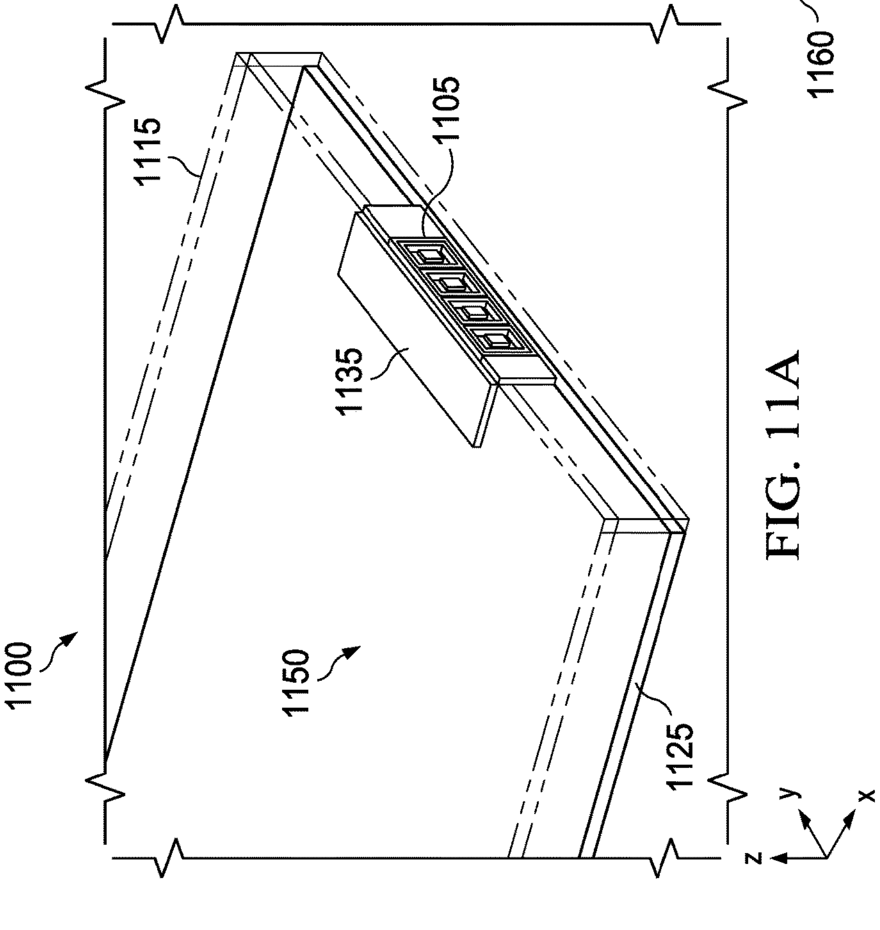
FIG. 11A is a schematic diagram illustrating another example adaptive mmWave antenna radome system, according to an implementation.

FIG. 11A is a schematic diagram illustrating another example adaptive mmWave antenna radome system 1100, according to an implementation. The example adaptive mmWave antenna radome system 1100 includes an mmWave AiP 1105 underneath a device cover 1115 of a device 1150 and PMC bands 1135 on the device cover 1115. FIG. 11B is a schematic diagram 1130 illustrating a zoomed-in view of the example adaptive mmWave antenna radome system 1100. FIG. 11C is a schematic diagram 1160 illustrating a top view of the example adaptive mmWave antenna radome system 1100.

The mmWave AiP 1105 is perpendicularly mounted on a ground plane 1125. The ground plane 1125 can be in plane or parallel with a plane where a screen (e.g., a touch screen or display, not shown in FIG. 11A) of the device 1150 is located. For example, the ground plane 1125 can be a front plane where the screen of the of the device 1150 is located. As another example, the ground plane 1125 can be a back plane opposing the front plane where the screen of the device 1150 is located.

The mobile phone cover comprises a mobile phone side or edge cover covering a side or edge of the mobile phone, wherein As shown in FIG.11A, the mmWave AiP 1105 is placed on a side (e.g., a top or bottom side) or edge of the device 1150. The side or edge can be peripheral to the screen of the moible phone, substantially spanning a thickness dimension of the device 1150. The device cover 1115 comprises a plane covering the ground plane 1125 (can be referred to as a back cover) and a plane covering the side or edge of the device 1150 (can be referred to as a side or edge cover). Multiple PMC bands 1135 are disposed on the device cover 1115 that surrounds an mmWave AiP 1105. The mmWave AiP 1105 is located underneath the mobile phone side or edge cover of the device cover 1115. The mmWave AiP 1105 includes 4 antenna elements with 1×4 horizontal placement.

The mmWave AiP 1105 is enclosed by the device cover 1115. The device cover 1115 can serve as a superstrate of the mmWave AiP 1105. As shown in FIG. 11C, the mmWave AiP 1105 is separated from the device cover 1115 in both a first dimension (e.g., along the x axis in the horizontal plane in this example) and a second dimension (e.g., along the y axis in the horizontal plane in this example). The PMC bands 1135 form a U shape that surrounds the mmWave AiP 1105.

As shown in FIG. 11A, the device cover 1115 is a folded cover, for example, that includes a back cover and a side or edge cover. The device cover 1115 can be an example of a dielectric cover of a device (e.g., a mobile phone). The dielectric cover can be, for example, a dielectric cover of a mobile phone spanning at least a top or bottom side or edge of the mobile phone.

As shown in FIGS. 11A-C, the mmWave AiP 1105 is surrounded by three PMC bands 1135 except on the ground plane 1125 to suppress guided waves in the device cover 1115. The PMC bands 1135 are disposed an inner surface of the device cover 1115 that is facing towards the mmWave AiP 1105. Note that the PMC bands 1135 do not overlap with the mmWave AiP 1105. In some implementations, a dimension (e.g., a length, width, or thickness) of each of the PMC bands 1135 can be configured or co-designed with the mmWave AiP 1105, the device cover 1115, or other factors in the surrounding environment of the mmWave AiP 1105 to electronically truncate the device cover 1115 and form an antenna radome for the mmWave AiP 1105.

Figure 12:
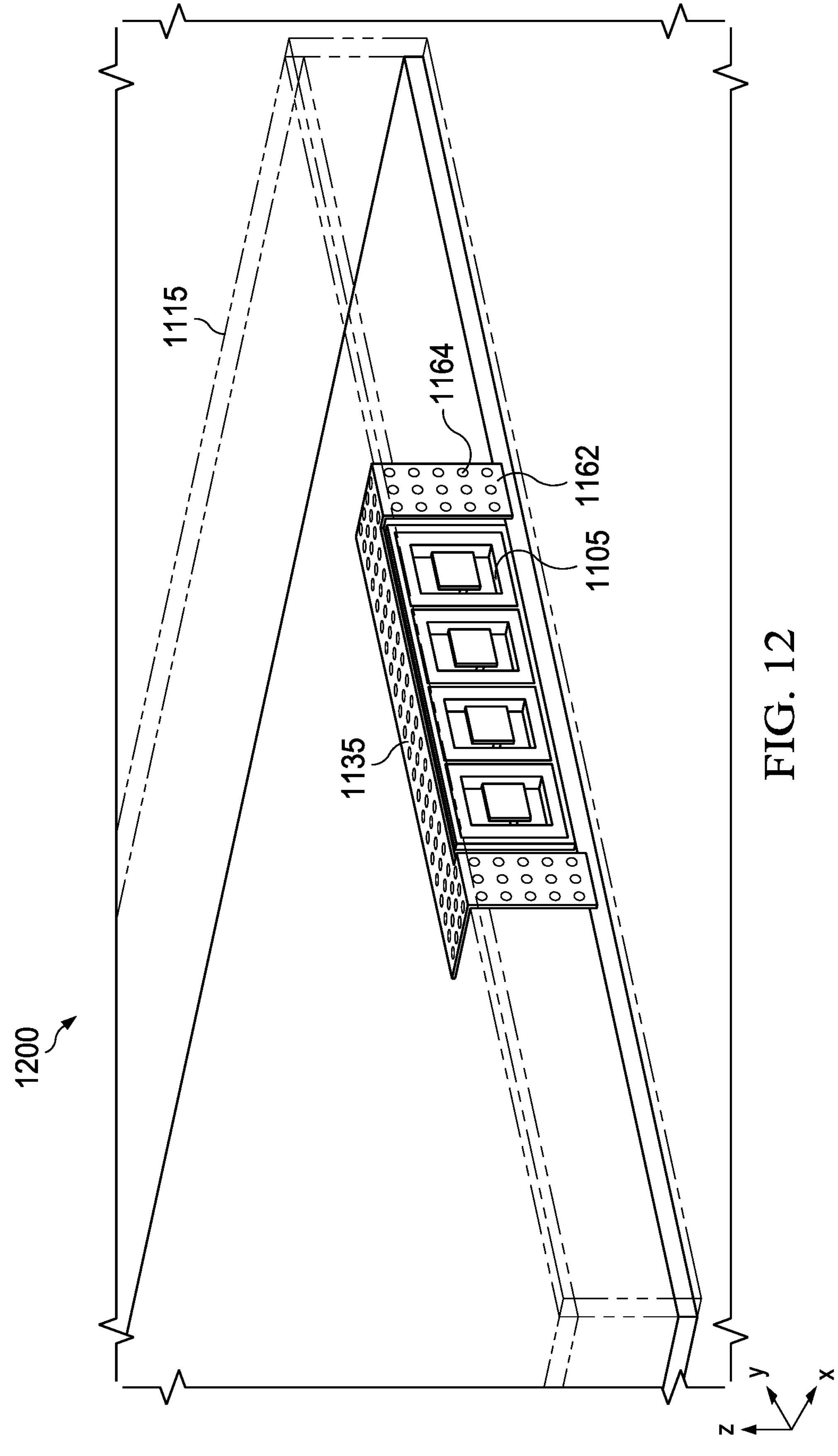
FIG. 12 is a schematic diagram illustrating an example structure of a PMC equivalent material that forms the PMC surfaces of the example adaptive mmWave antenna radome system, according to an implementation.

FIG. 12 is a schematic diagram 1200 illustrating an example structure of a PMC equivalent material that forms the PMC surfaces 1135 of the example adaptive mmWave antenna radome system 1100, according to an implementation. The PMC equivalent material has a PGB structure with periodic circular holes 1164 in a dielectric material 1162, similar to the PMC equivalent material 565 in FIG. 5. In some implementations, the dimensions and placement of each circular hole 1164 can be designed or otherwise configured, for example, to optimize or otherwise improve the impedance or other properties of the PMC equivalent material to better suppress guided waves in the device cover 1115. In some implementations, the PMC equivalent material that forms the PMC surfaces 1135 can have another structure or pattern. For example, the PMC equivalent material that forms the PMC surfaces 1135 can have a structure similar to the PMC equivalent material 960 in FIG. 9D.

Figure 13A:
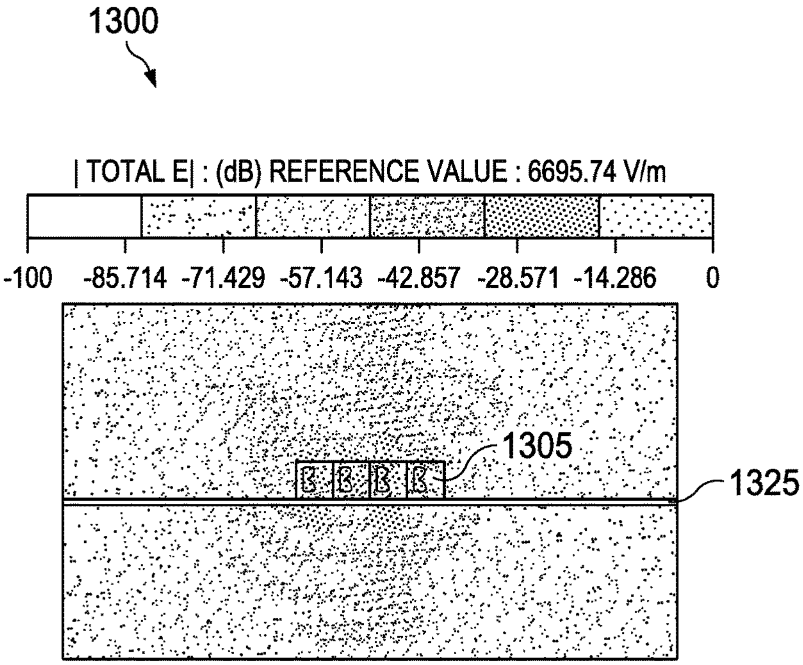
FIG. 13A is a plot illustrating an electric field (E-field) of an example 1×4 patch antenna array perpendicularly mounted on a PCB ground plane in free space without a glass cover, according to an implementation.
Figure 13B:
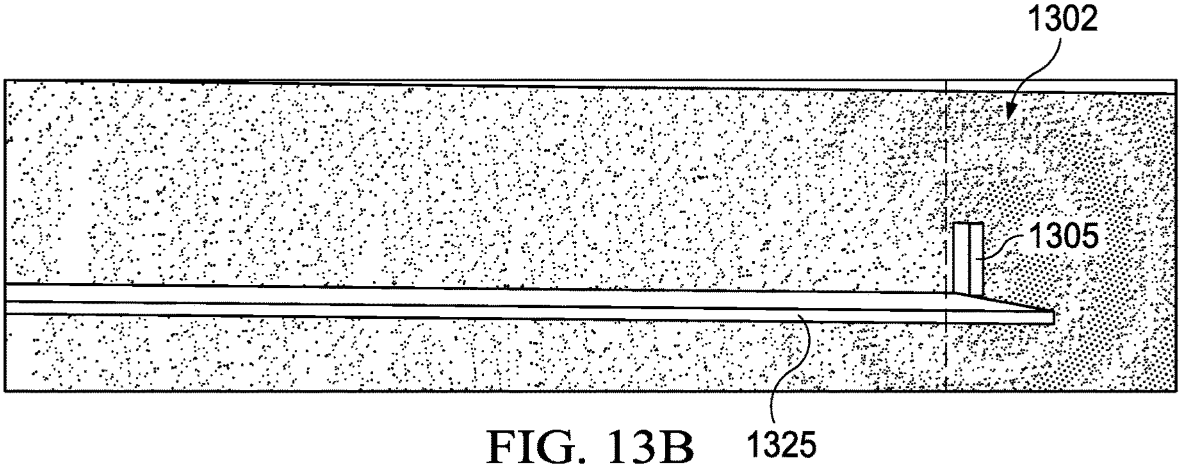
FIG. 13B is a plot illustrating perspective view of the E-field of the example 1×4 patch antenna array perpendicularly mounted on the PCB ground plane in free space without a glass cover.

FIG. 13A is a plot illustrating an electric field (E-field) 1300 of an example 1×4 patch antenna array 1305 perpendicularly mounted on a PCB ground plane 1325 in free space without a glass cover, according to an implementation. FIG. 13B is a plot illustrating perspective view 1302 of the E-field 1300 of the example 1×4 patch antenna array 1305 perpendicularly mounted on the PCB ground plane 1325 in free space without a glass cover.

Figure 13C:
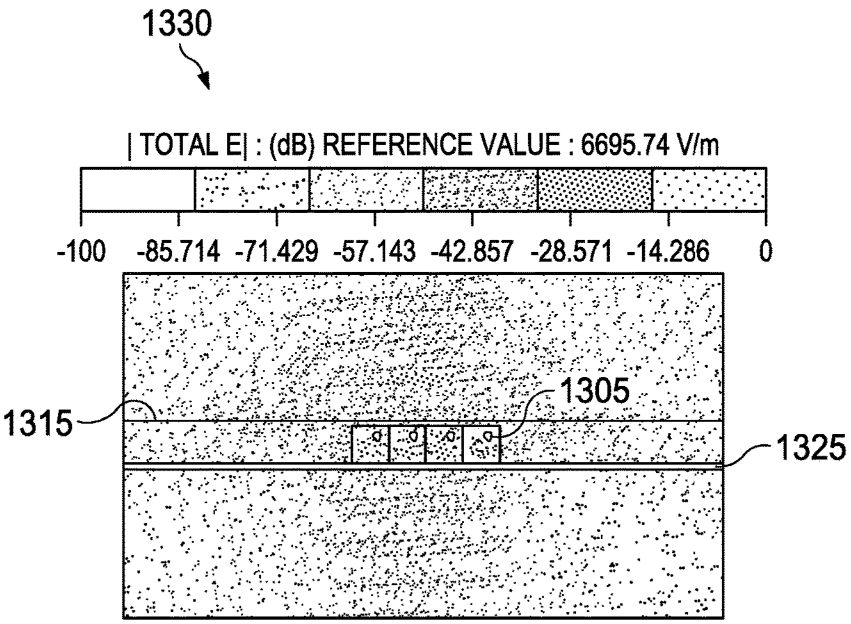
FIG. 13C is a plot illustrating an electric field (E-field) of the example 1×4 patch antenna array perpendicularly mounted on the PCB ground plane with a glass cover, according to an implementation.
Figure 13D:
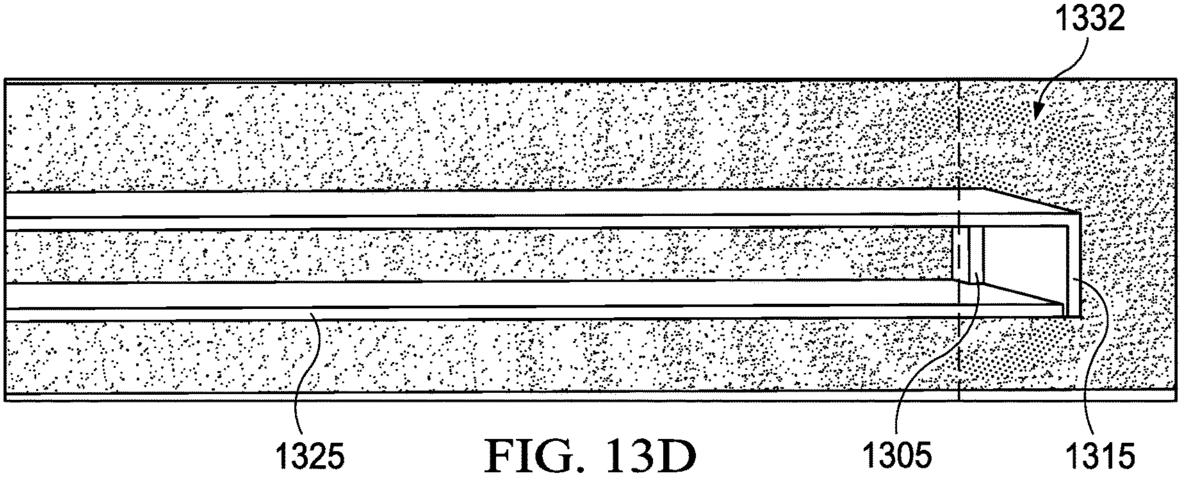
FIG. 13D is a plot illustrating perspective view of the E-field 1330 of the example 1×4 patch antenna array perpendicularly mounted on the PCB ground plane 1325 with the glass cover.

FIG. 13C is a plot illustrating an electric field (E-field) 1330 of the example 1×4 patch antenna array 1305 (e.g., an antenna system of a device) perpendicularly mounted on the PCB ground plane 1325 with a glass cover 1315 (e.g., a device cover), according to an implementation. The glass cover 1315, covers the example 1×4 patch antenna array 1305 and the PCB ground plane 1325. FIG. 13D is a plot illustrating perspective view 1332 of the E-field 1330 of the example 1×4 patch antenna array 1305 perpendicularly mounted on the PCB ground plane 1325 with the glass cover 1315.

Figure 13E:
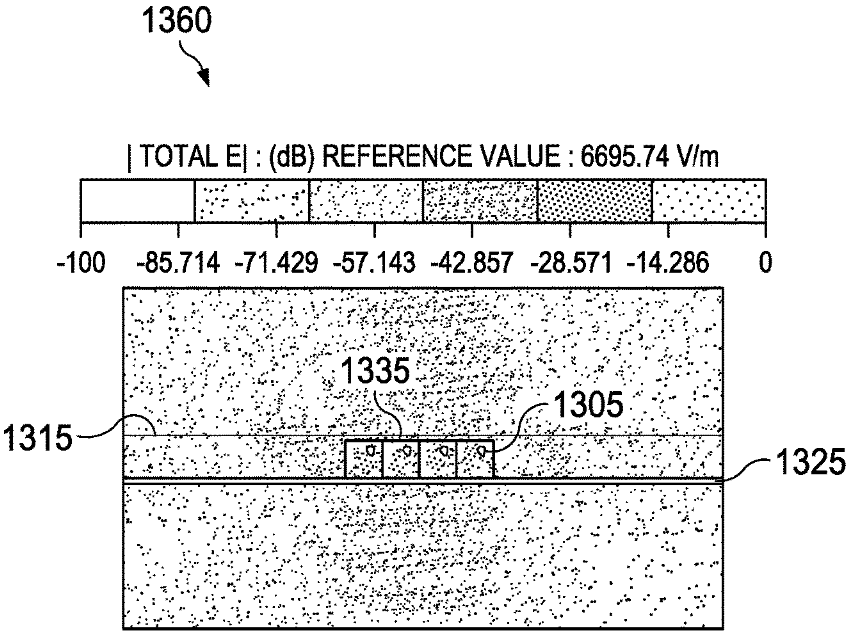
FIG. 13E is a plot illustrating an electric field (E-field) of the example 1×4 patch antenna array 1305 perpendicularly mounted on the PCB ground plane with the glass cover as well as surrounding PMC surfaces, according to an implementation.
Figure 13F:
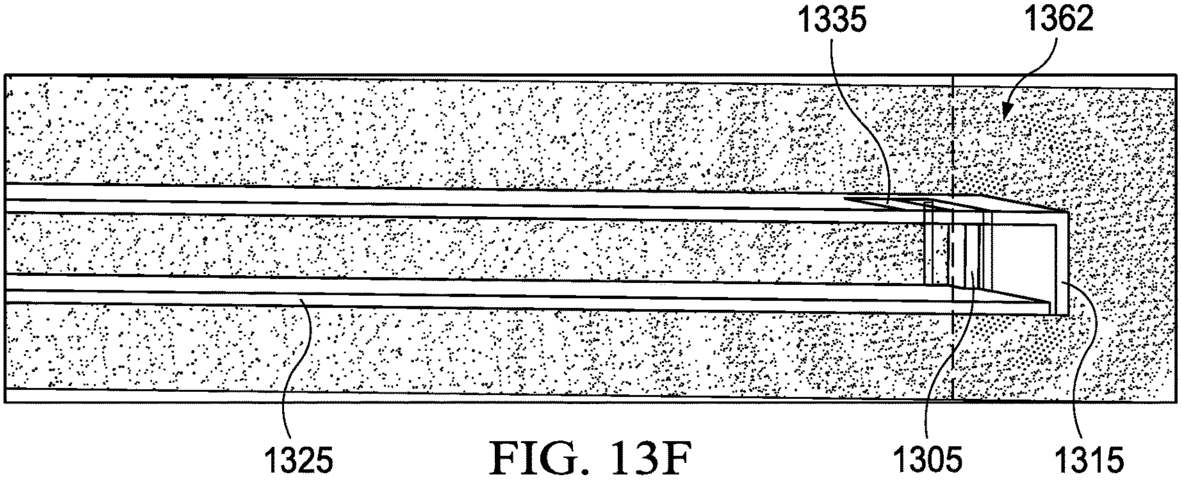
FIG. 13F is a plot illustrating perspective view of the E-field of the example 1×4 patch antenna array perpendicularly mounted on the PCB ground plane 1325 with the glass cover as well as surrounding PMC surfaces.

FIG. 13E is a plot illustrating an electric field (E-field) 1360 of the example 1×4 patch antenna array 1305 perpendicularly mounted on the PCB ground plane 1325 with the glass cover 1315 as well as surrounding PMC surfaces, according to an implementation. FIG. 13F is a plot illustrating a perspective view 1362 of the E-field 1360 of the example 1×4 patch antenna array 1305 perpendicularly mounted on the PCB ground plane 1325 with the glass cover 1315 as well as surrounding PMC surfaces 1335. The example 1×4 patch antenna array 1305 perpendicularly mounted on the PCB ground plane 1325 with the glass cover 1315 as well as surrounding PMC surfaces 1335 can be an example adaptive mmWave antenna radome system 1100 of FIGS. 11A-C. Guided waves in the glass cover 1315 and surface waves on the ground plane 1325 as shown in the E-field 1330 can be partially suppressed with the surrounding PMC surfaces 1335 as shown in the E-field 1360.

Figure 14A:
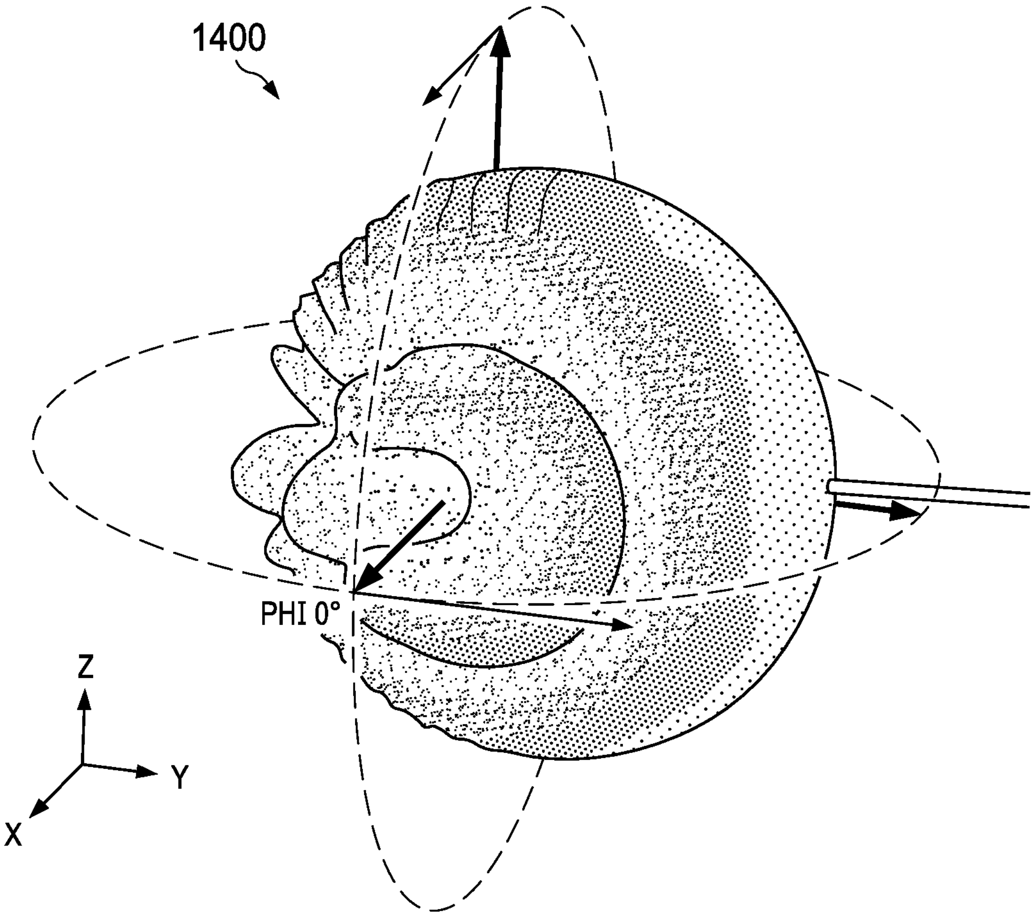
FIG. 14A is a plot illustrating an antenna gain pattern of an example AiP antenna array (e.g., a 1×4 AiP) perpendicularly mounted on a PCB ground plane in free space without any device cover (as shown in FIGS. 13A-B), according to an implementation.
Figure 14B:
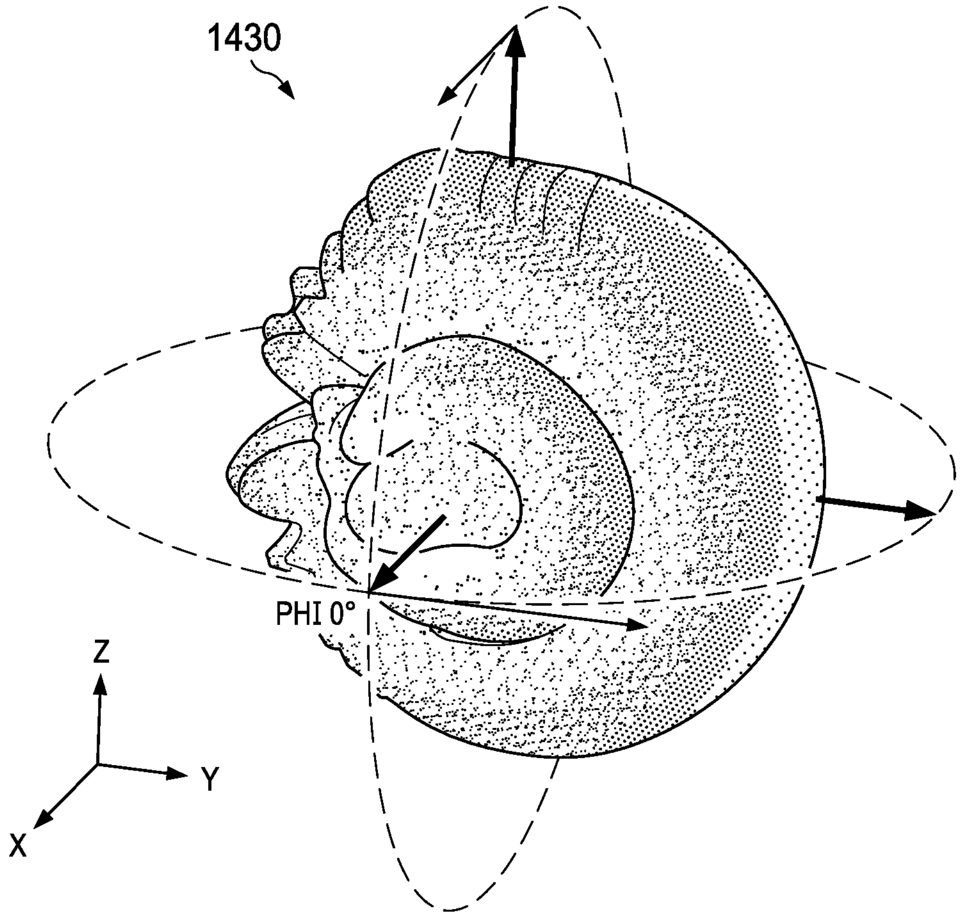
FIG. 14B is a plot illustrating an antenna gain pattern of an example AiP antenna array perpendicularly mounted on a PCB ground plane under a folded glass cover (as shown in FIGS. 13C-D), according to an implementation.
Figure 14C:
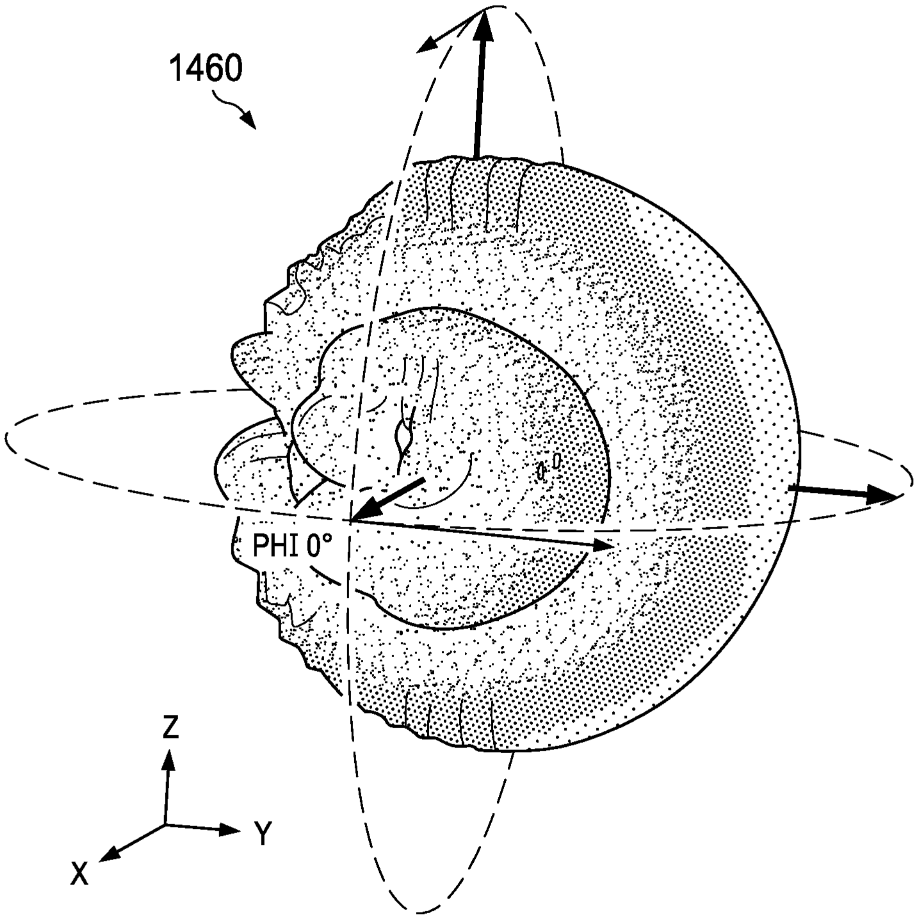
FIG. 14C is a plot illustrating an antenna gain pattern of an example AiP antenna array perpendicularly mounted on a PCB ground plane under a folded glass cover with a PMC surface (as shown in FIGS. 13E-F), according to an implementation.

FIG. 14A is a plot illustrating an antenna gain pattern 1400 of an example AiP antenna array (e.g., an 1×4 AiP) perpendicularly mounted on a PCB ground plane in free space without any device cover (as shown in FIGS. 13A-B), according to an implementation. The antenna gain pattern 1400 shows a peak gain of 10.9 dB for the example AiP antenna array 1405 on the PCB ground plane in free space without any device cover. FIG. 14B is a plot illustrating an antenna gain pattern 1430 of an example AiP antenna array perpendicularly mounted on a PCB ground plane under a folded glass cover (as shown in FIGS. 13C-D), according to an implementation. The antenna gain pattern 1430 shows a peak gain of 8.8 dB for the example AiP antenna array perpendicularly mounted on the PCB ground plane under the folded glass cover. FIG. 14C is a plot illustrating an antenna gain pattern 1460 of an example AiP antenna array perpendicularly mounted on a PCB ground plane under a folded glass cover with a PMC surface (as shown in FIGS. 13E-F), according to an implementation. The antenna gain pattern 1460 shows a peak gain of 10.3 dB for the example AiP antenna array perpendicularly mounted on the PCB ground plane under the folded glass cover with the PMC surface.

As can be seen in FIGS. 14A-C, due to the folded glass cover, the main lobe (peak gain) direction of the example AiP antenna array when it is perpendicularly mounted on the PCB ground plane tilts upwards (towards the folded glass cover). With the PMC surfaces on the folded glass cover surrounding the example AiP antenna array, guided waves propagating in the glass will be suppressed. As a result, the main lobe direction will move back towards the horizontal plane, 1.5 dB improvement on peak gain and smaller back lobe can be achieved.

Figure 15A:
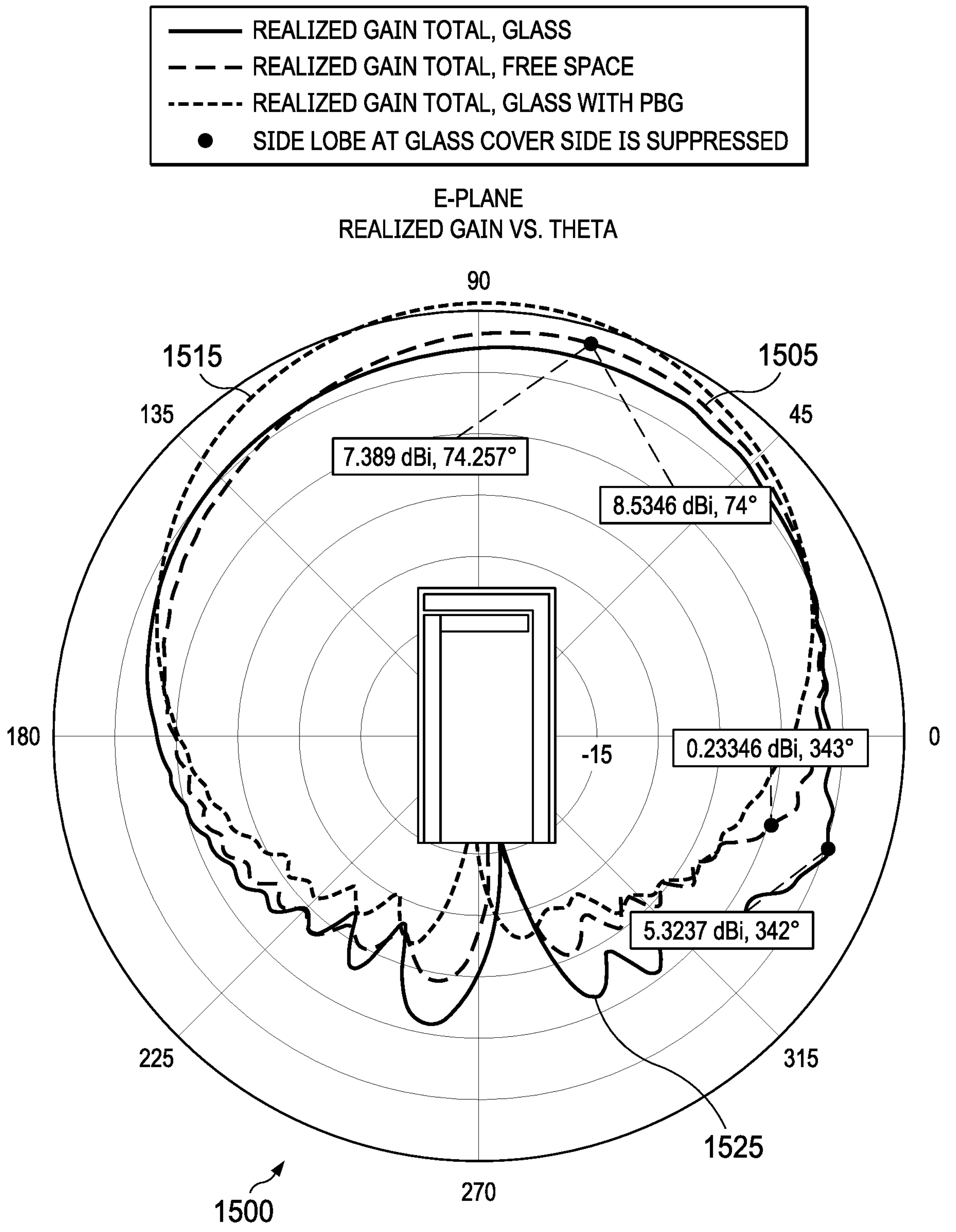
FIG. 15A is a plot illustrating a gain vs. angle pattern of an example AiP antenna array in free space without any device cover (e.g., as shown in FIGS. 13A-B), a gain vs. angle pattern of an example AiP antenna array under a glass cover (e.g., as shown in FIGS. 13C-D), and a gain vs. angle pattern of an example AiP antenna array under a glass cover with PMC surfaces (e.g., as shown in FIGS. 13E-F), in an E-field plane, according to an implementation.

FIG. 15A is a plot 1500 illustrating a gain vs. angle pattern 1505 of an example AiP antenna array in free space without any device cover (e.g., as shown in FIGS. 13A-B), a gain vs. angle pattern 1515 of an example AiP antenna array under a glass cover (e.g., as shown in FIGS. 13C-D), and a gain vs. angle pattern 1525 of an example AiP antenna array under a glass cover with PMC surfaces (e.g., as shown in FIGS. 13E-F), in an E-field plane, according to an implementation.

Figure 15B:
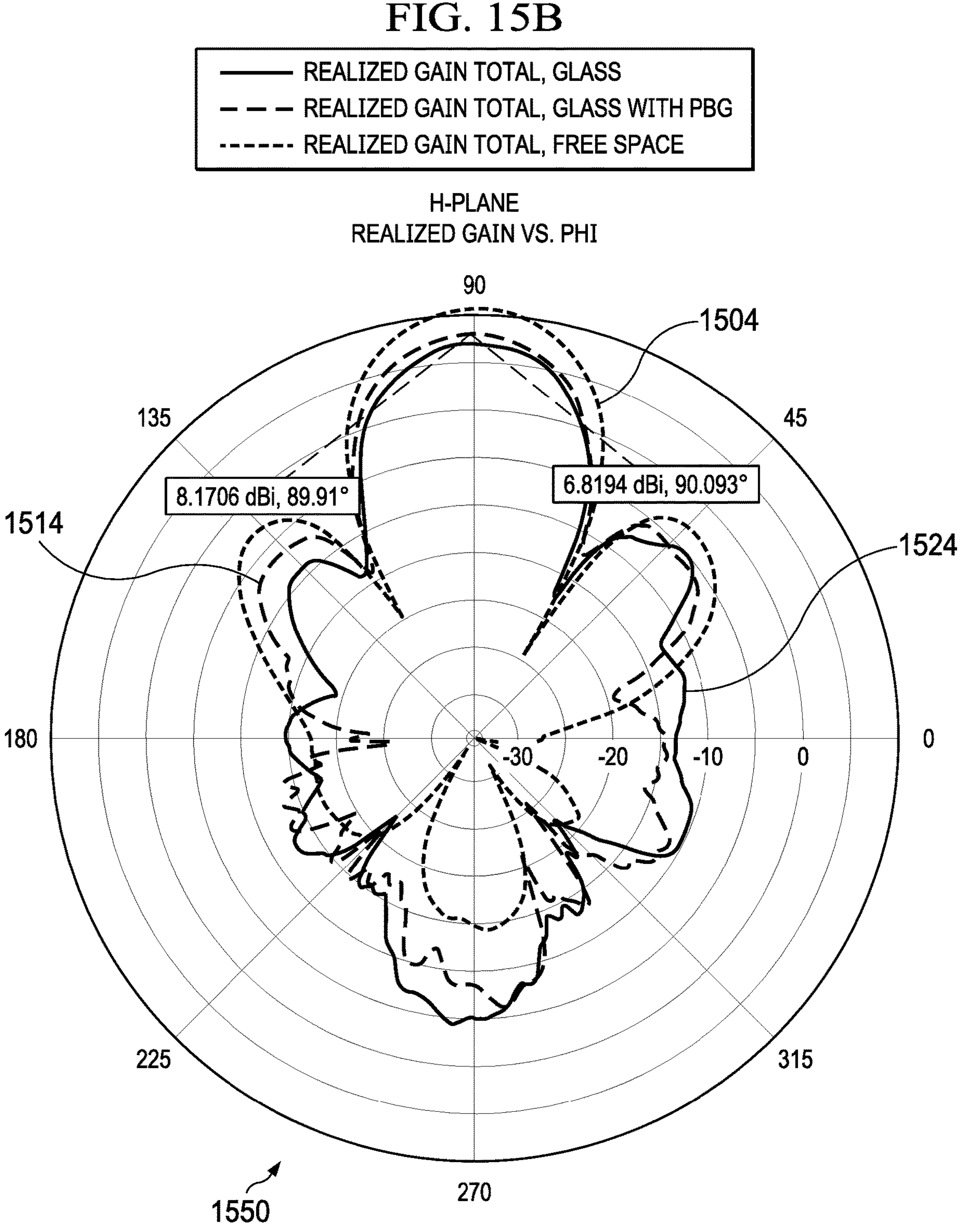
FIG. 15B is a plot illustrating a gain vs. angle pattern of an example AiP antenna array in free space without any device cover (e.g., as shown in FIGS. 13A-B), a gain vs. angle pattern of an example AiP antenna array under a glass cover (e.g., as shown in FIGS. 13C-D), and a gain vs. angle pattern of an example AiP antenna array under a glass cover with PMC surfaces (e.g., as shown in FIGS. 13E-F), in a magnetic field (H-field) plane, according to an implementation.

FIG. 15B is a plot 1550 illustrating a gain vs. angle pattern 1504 of an example AiP antenna array in free space without any device cover (e.g., as shown in FIGS. 13A-B), a gain vs. angle pattern 1514 of an example AiP antenna array under a glass cover (e.g., as shown in FIGS. 13C-D), and a gain vs. angle pattern 1524 of an example AiP antenna array under a glass cover with PMC surfaces (e.g., as shown in FIGS. 13E-F), in a magnetic field (H-field) plane, according to an implementation. The gain vs. angle patterns 1505, 1515, 1525, 1504, 1514, and 1524 are all measured at phi=90° at 28 GHz frequency.

As can be seen in FIGS. 15A-15B, side lobes at the glass cover side of the gain vs. angle patterns 1525 and 1524 of the example AiP antenna array under the glass cover with PMC surfaces are suppressed compared to the counterpart patterns 1515 and 1514 of the example AiP antenna array under the glass cover without a PMC surface.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

What is claimed is:

1. A device comprising:
a device cover; and
an antenna system underneath the device cover,
wherein the device cover is separated from the antenna system,
wherein the device cover comprises a dielectric device cover,
wherein the device cover further comprises a perfect magnetic conductor (PMC) equivalent material surrounding the antenna system without overlapping the antenna system, and
wherein the PMC equivalent material is planar.

2. The device of claim 1, wherein the antenna system comprises one or more antenna system elements.

3. The device of claim 1, wherein the antenna system comprises an antenna in package (AiP), an antenna on board (AoB), or an antenna in Module (AiM).

4. The device of claim 1, wherein the antenna system comprises one or more antennas configured to operate in mmWave frequency.

5. The device of claim 1, wherein the device cover serves as a superstrate of the antenna system, and the PMC equivalent material is disposed on a surface of the dielectric device cover facing towards the antenna system.

6. The device of claim 1, wherein the PMC equivalent material is of a width equal to or larger than $\lambda d/2$, wherein $\lambda d$ is an effective wavelength of a guided wave in the device cover.

7. The device of claim 1, wherein the PMC equivalent material has a structure that suppresses microwaves inside of the device cover.

8. The device of claim 7, wherein the structure comprises an Electromagnetic Band Gap (EBG) or a Photonic Band Gap (PBG) structure.

9. The device of claim 1, wherein the PMC equivalent material comprises a plurality of holes in a dielectric substrate, wherein a shape and dimension of the plurality of holes are determined based on dielectric parameters of the device cover and a distance between the device cover and the antenna system.

10. A device cover comprising:

a substrate, a first surface of the substrate facing an antenna system underneath the substrate, and the substrate being separated from the antenna system; and a perfect magnetic conductor (PMC) equivalent material disposed on the first surface of the substrate, the PMC equivalent material surrounding the antenna system without overlapping the antenna system, a second surface of the PMC equivalent material parallel to the first surface of the substrate being of a rectangular frame shape.

11. The device cover of claim 10, wherein the substrate is of a dielectric material.

12. The device cover of claim 10, wherein the PMC equivalent material is of a width equal to or larger than λd/2, wherein λd is an effective wavelength of a guided wave in the device cover.

13. The device cover of claim 10, wherein the PMC equivalent material has an Electromagnetic Band Gap (EBG) or a Photonic Band Gap (PBG) structure.

14. The device cover of claim 10, wherein the PMC equivalent material comprises a plurality of holes in a dielectric substrate, wherein a shape and dimension of the plurality of holes are determined based on dielectric parameters of the device cover and a distance between the device cover and the antenna system.

15. A mobile phone comprising:

a mobile phone cover; and an antenna system underneath the mobile phone cover, wherein the mobile phone cover is separated from the antenna system; and wherein the mobile phone cover comprises a perfect magnetic conductor (PMC) equivalent material surrounding the antenna system without overlapping the antenna system, a shape of the PMC equivalent material matching a shape of the antenna system.

16. The mobile phone of claim 15, wherein the antenna system comprises an antenna in package (AiP), an antenna on board (AoB), or an antenna in Module (AiM).

17. The mobile phone of claim 15, wherein the mobile phone cover comprises a mobile phone front cover covering a front side of the mobile phone, the front side comprising a screen of the mobile phone.

18. The mobile phone of claim 15, wherein the mobile phone cover comprises a mobile phone back cover covering a back side of the mobile phone, the back side opposing a screen of the mobile phone.

19. The mobile phone of claim 15, wherein the mobile phone cover comprises a mobile phone side or edge cover covering a side or an edge of the mobile phone, the side or the edge of the mobile phone being peripheral to a screen of the mobile phone.

20. The device of claim 1, wherein the antenna system includes at least 4 patches of antenna elements, wherein the PMC equivalent material includes multiple metallic elements, and wherein a bottom surface of the PMC equivalent material is above a top surface of the antenna system by a positive gap value along a direction perpendicular to the top surface of the antenna system.

* * * * *